(12) United States Patent
Nikolskiy et al.

(10) Patent No.: US 11,185,394 B2
(45) Date of Patent: Nov. 30, 2021

(54) COMPUTER-IMPLEMENTED DENTAL RESTORATION DESIGN

(71) Applicant: James R. Glidewell Dental Ceramics, Inc., Newport Beach, CA (US)

(72) Inventors: Sergey Vladimirovich Nikolskiy, Coto de Caza, CA (US); Sergei Azernikov, Irvine, CA (US); Shawn Andrews Ramirez, Santa Ana, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 544 days.

(21) Appl. No.: 14/468,946

(22) Filed: Aug. 26, 2014

(65) Prior Publication Data

US 2015/0056576 A1 Feb. 26, 2015

Related U.S. Application Data

(60) Provisional application No. 61/869,922, filed on Aug. 26, 2013.

(51) Int. Cl.
*A61C 9/00* (2006.01)
*A61C 13/00* (2006.01)
(52) U.S. Cl.
CPC .......... *A61C 9/004* (2013.01); *A61C 13/0004* (2013.01)
(58) Field of Classification Search
CPC .......................... A61C 13/0004; A61C 9/004
See application file for complete search history.

(56) References Cited

U.S. PATENT DOCUMENTS

| 5,273,429 A | 12/1993 | Rekow et al. |
| 5,431,562 A | 7/1995 | Andreiko et al. |
| 5,447,432 A | 9/1995 | Andreiko et al. |
| 7,245,753 B2 | 7/2007 | Squilla et al. |
| 7,740,476 B2 | 6/2010 | Rubbert et al. |
| 8,386,061 B2 | 2/2013 | Violante et al. |
| 8,594,820 B2 | 11/2013 | Manai et al. |

(Continued)

FOREIGN PATENT DOCUMENTS

| DE | 102011008074 A1 | 7/2012 |
| WO | 2005004743 A1 | 1/2005 |

(Continued)

OTHER PUBLICATIONS

PCT/US2014/052719, International Preliminary Reporton Patentability, dated Mar. 1, 2016, in 2 pages.

(Continued)

*Primary Examiner* — Doon Y Chow
*Assistant Examiner* — Carina Yun
(74) *Attorney, Agent, or Firm* — Charles Fowler

(57) ABSTRACT

Computer-implemented methods of designing dental restorations and systems for performing the described methods are provided. In an embodiment, a method includes providing a virtual three dimensional representation of at least a portion of the patient's dentition that includes at least one preparation tooth, identifying a preparation margin on the virtual three dimensional representation, placing an arch form of a virtual tooth library in alignment with the virtual three dimensional representation, and proposing an initial restoration design based upon a tooth design obtained from the virtual tooth library.

12 Claims, 22 Drawing Sheets

(56) References Cited

U.S. PATENT DOCUMENTS

| | | |
|---|---|---|
| 8,727,776 B2 | 5/2014 | Mehl |
| 2004/0197728 A1* | 10/2004 | Abolfathi ............... A61C 7/00 433/24 |
| 2006/0115793 A1* | 6/2006 | Kopelman ........... A61B 5/0002 433/215 |
| 2007/0211081 A1 | 9/2007 | Quadling et al. |
| 2009/0162813 A1* | 6/2009 | Glor ..................... A61C 1/084 433/196 |
| 2009/0325125 A1* | 12/2009 | DiAngelo ........... A61C 8/0001 433/173 |
| 2010/0151417 A1* | 6/2010 | Nilsson ................. A61C 7/002 433/167 |
| 2010/0191510 A1 | 6/2010 | Kopelman |
| 2011/0038514 A1* | 2/2011 | Weigl ................... A61C 9/0053 382/128 |
| 2011/0196654 A1 | 8/2011 | Genest et al. |
| 2012/0070803 A1 | 3/2012 | Manai et al. |
| 2012/0072177 A1 | 3/2012 | Manai et al. |
| 2012/0095732 A1 | 4/2012 | Fisker et al. |
| 2012/0139142 A1* | 6/2012 | Van Der Zel ...... A61C 13/0004 264/20 |
| 2013/0282351 A1 | 10/2013 | Tank |

FOREIGN PATENT DOCUMENTS

| | | |
|---|---|---|
| WO | WO2010068676 A2 | 6/2010 |
| WO | 2010105628 A2 | 9/2010 |
| WO | 2011089470 A1 | 7/2011 |

OTHER PUBLICATIONS

PCT/US2014/052719, Written Opinion of the International Searching Authority, dated Feb. 11, 2015, in 7 pages.
PCT/US2014/052719, International Search Report, dated Feb. 11, 2015, in 4 pages.

* cited by examiner

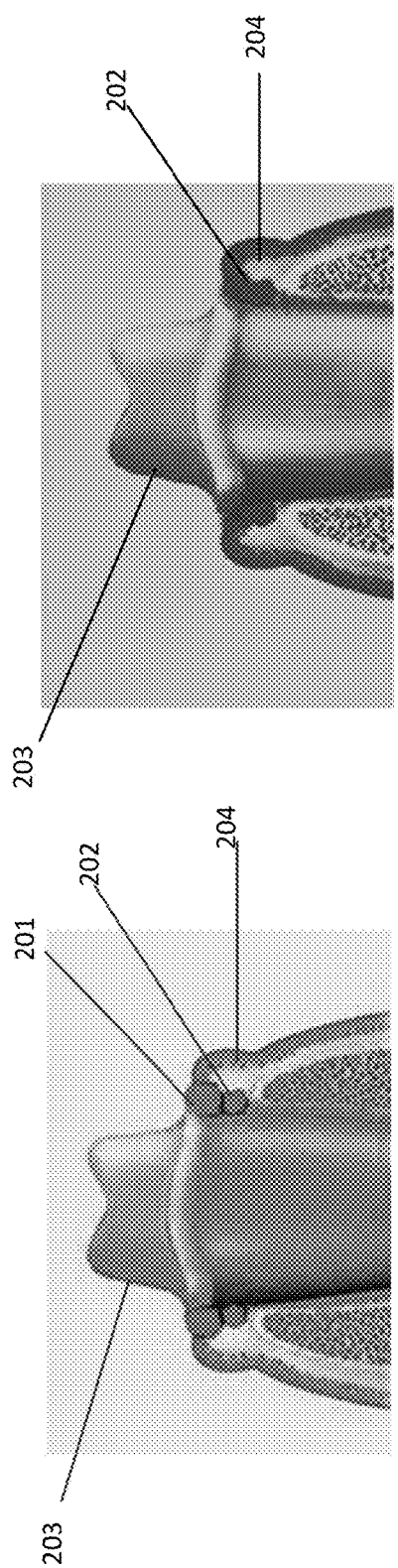
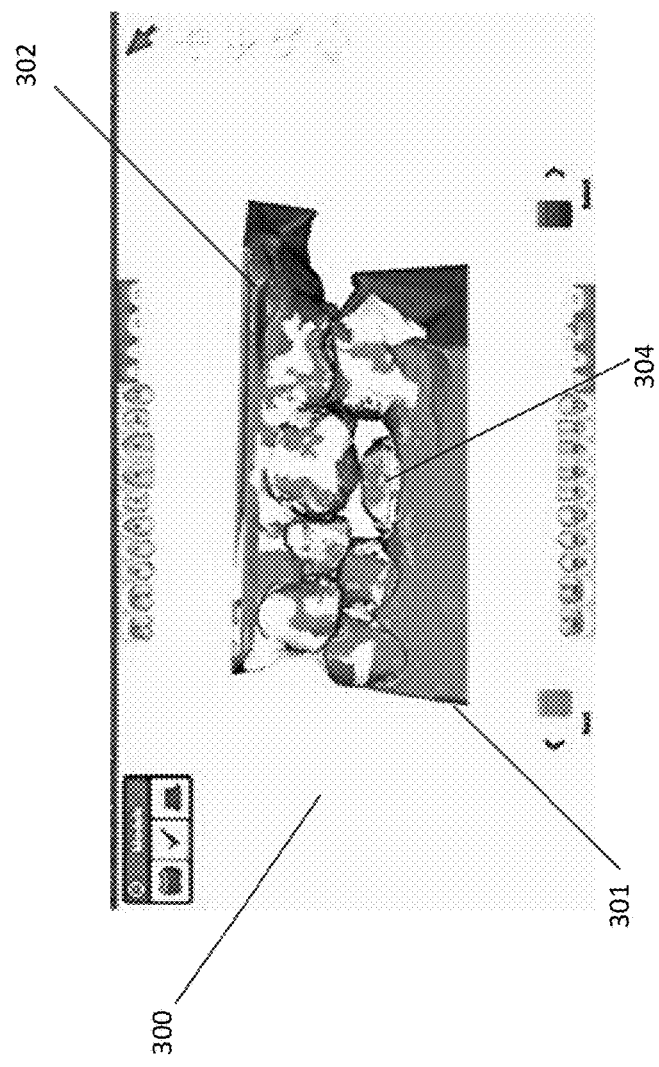

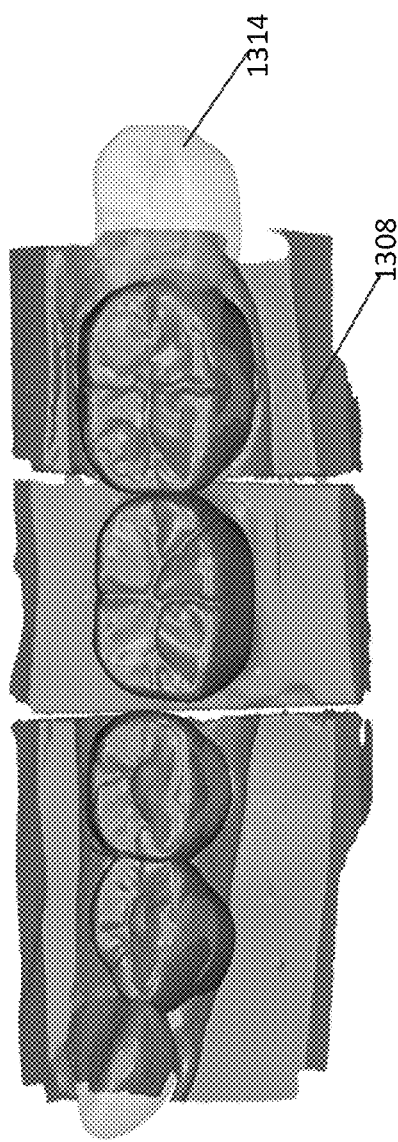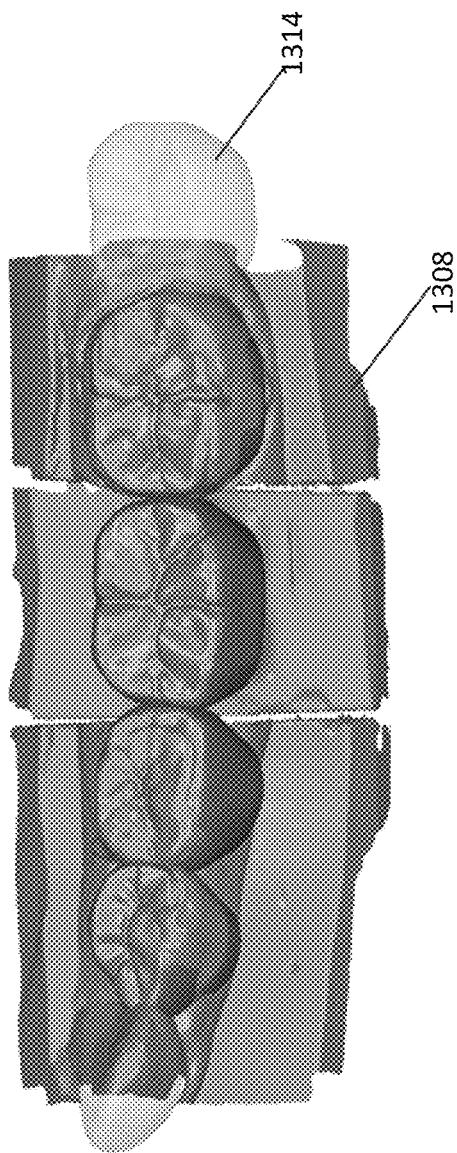
Fig. 14A
Fig. 14B

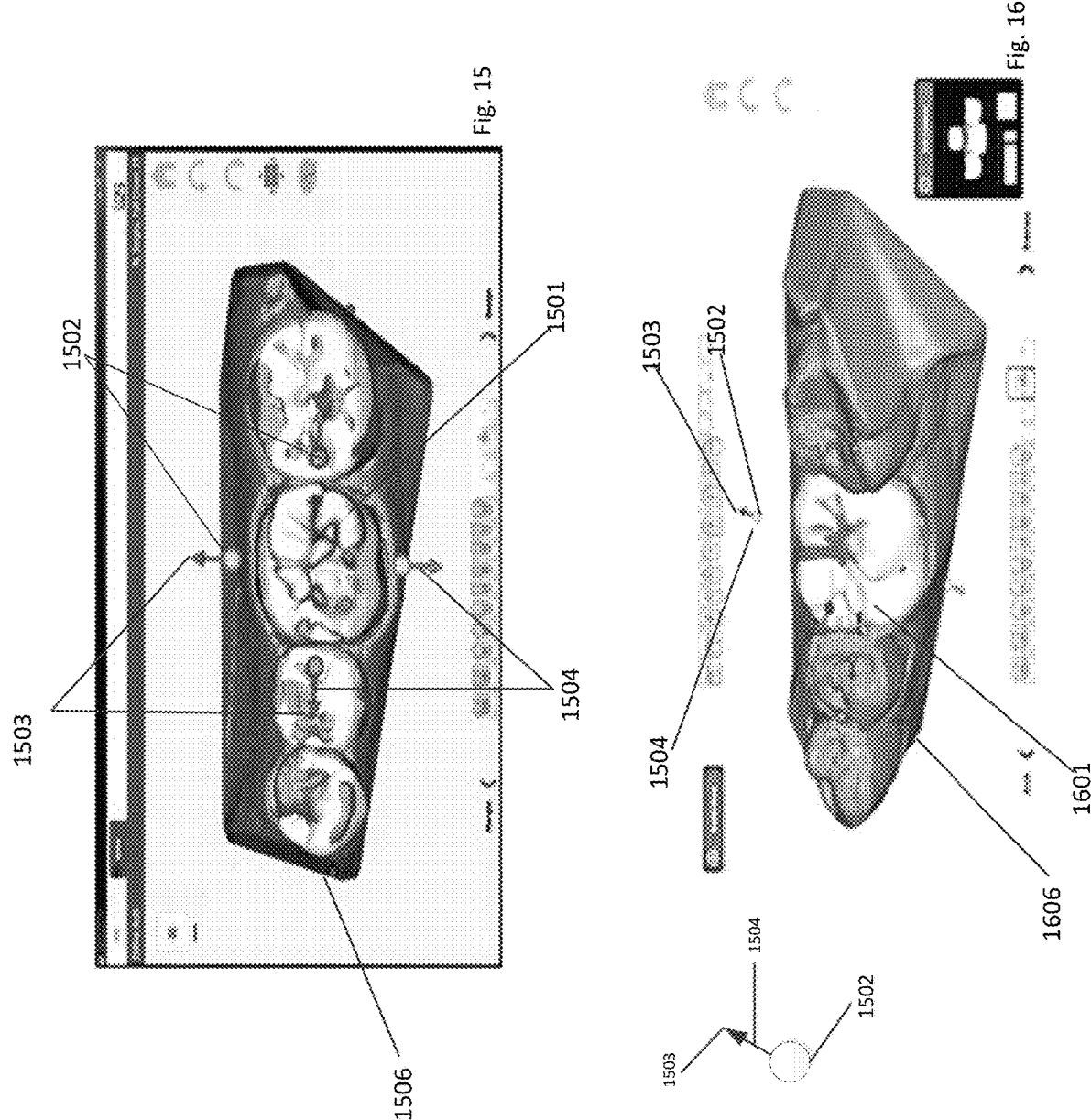

1701

1701

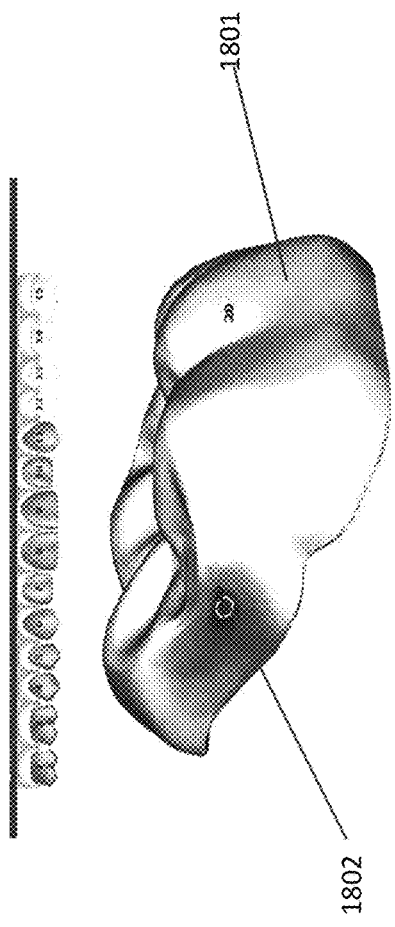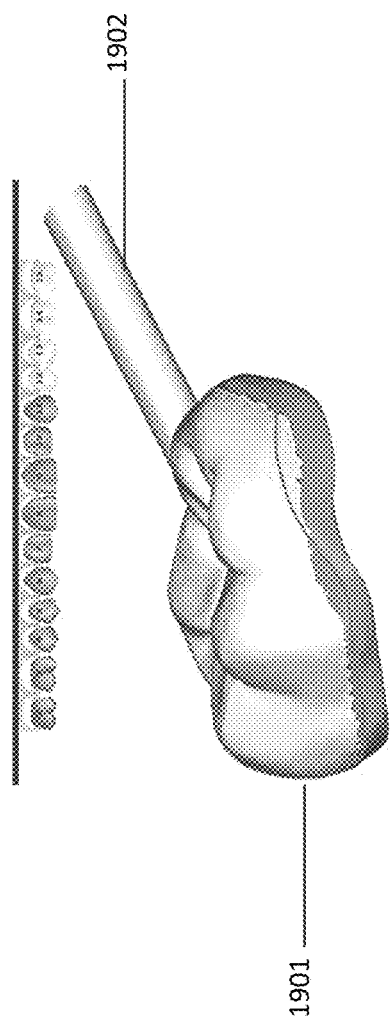

COMPUTER-IMPLEMENTED DENTAL RESTORATION DESIGN

CROSS-REFERENCE TO RELATED APPLICATION

This application claims the benefit of and priority to U.S. Provisional Application Ser. No. 61/869,922, filed Aug. 26, 2013, the contents of which are hereby incorporated by reference herein.

BACKGROUND

CAD/CAM dentistry (Computer-Aided Design and Computer-Aided Manufacturing in dentistry) is a field of dentistry using CAD or CAM technology to provide a range of dental restorations, including crowns, veneers, inlays and onlays, fixed bridges, dental implant restorations, and orthodontic appliances. Although CAD/CAM dentistry was used as early as the mid-1980s, early efforts were considered a cumbersome novelty, requiring an inordinate amount of time to produce a viable product. This inefficiency prevented its use within dental offices and limited it to larger dental laboratories. As adjunctive techniques, software, and materials improved, CAD/CAM use within dental laboratories and dental practices has increased. Advances in dental restoration technology also include the use of imaging technologies, including intraoral imaging technologies, and the incorporation of digital or computer-controlled components in contrast to that of mechanical or electrical alone.

"Chairside" CAD/CAM restoration differs from conventional dentistry in that the prosthesis is typically luted or bonded the same day. Conventional prostheses, such as crowns, have temporaries placed from one to several weeks while a dental laboratory or in-house dental lab produces the restoration. The patient returns later to have the temporaries removed and the laboratory-made crown cemented or bonded in place. Advances in software and an in-house CAD/CAM system provide efficiency, and enable laboratories and dentists to create a finished inlay in as little as an hour in some cases. CAD/CAM restorations are also typically more conservative in their preparation of the tooth. As bonding is more effective on tooth enamel than the underlying dentin, care is taken not to remove the enamel layer.

In a typical CAD/CAM dental procedure, the preparation tooth is first photographed and stored as a three dimensional digital model and software is then used to approximate the restoration shape using comparisons to surrounding teeth. The practitioner then refines that model using 3D CAD software. When the design phase is complete, the information is sent to a milling unit which mills the actual restoration from a solid block of material using one or more machine tools. The restoration is bonded to the tooth using a cement or other adhesive which bonds to both the restoration as well as the tooth itself.

The treating dentist prepares the tooth being restored either as a crown, inlay, onlay or veneer. In some instances, the tooth is then powder sprayed with a thin layer of anti-reflective contrast medium. The prepared tooth and its surroundings are then imaged by a 3D imaging camera and uploaded to a computer. Alternatively, an impression is obtained that may be scanned directly, or formed into a model to be scanned, and then uploaded to a computer by the dentist or a dental laboratory. Using software, a restoration can be designed to restore the tooth to its appropriate form and function. This data on this restoration is stored in a file and is sent to a milling machine. The restoration can then be milled out of a solid ceramic, glass, glass-ceramic, or composite block. Milling times may vary from as little as a few minutes to thirty minutes or more depending on the complexity of the restoration and the version of the milling unit.

Commercially available box or model scanners, such as scanners offered by 3Shape, may be used for scanning a model of a patient's dentition by a dentist or a dental laboratory. Moreover, there are several intraoral imaging technologies and products that are currently available, including FastScan® (IOS Technologies, Inc.), CEREC® (Sirona), E4D (D4D Technologies), True Definition Scanner (3M ESPE), Trios® (3Shape), and iTero™ (Cadent/Align Technology, Inc.). These intraoral scanners provide accurate acquisition and transfer of patient oral situation image information from the dental chair to the laboratory or chairside mill.

SUMMARY

The following describes computer-implemented methods of designing dental restorations and systems for performing the described methods.

According to a first aspect of the systems and methods described herein, there is provided a computer-implemented method of designing a dental restoration for a patient, wherein the method includes providing a virtual three dimensional representation of at least a portion of the patient's dentition that includes at least one preparation tooth; identifying a preparation margin on the virtual three dimensional representation; placing an arch form of a virtual tooth library in alignment with the virtual three dimensional representation; and proposing an initial restoration design based upon a tooth design obtained from the virtual tooth library. In some examples of the first aspect, the method of designing a dental restoration further includes modifying the initial restoration design to obtain a final restoration design. In still other examples of the first aspect, the method of designing a dental restoration further includes using the final restoration design to manufacture a final restoration.

According to another aspect of the systems and methods described herein, there is provided a non-transitory computer readable medium storing a program causing a computer to execute a dental restoration design process, wherein the dental restoration design process includes providing a virtual three dimensional representation of at least a portion of the patient's dentition that includes at least one preparation tooth; identifying a preparation margin on the virtual three dimensional representation; placing an arch form of a virtual tooth library in alignment with the virtual three dimensional representation; and proposing an initial restoration design based upon a tooth design obtained from the virtual tooth library. In some examples of the first aspect, the method of designing a dental restoration further includes modifying the initial restoration design to obtain a final restoration design. In still other examples of the first aspect, the method of designing a dental restoration further includes using the final restoration design to manufacture a final restoration.

BRIEF DESCRIPTION OF THE DRAWINGS

FIGS. 2A and 2B are cross-sectional side views of a preparation tooth illustrating a two-cord retraction technique.

FIG. 3 is an example of a visual representation of a virtual three dimensional model of a preparation tooth and its surrounding and opposing teeth.

FIGS. 14A and 14B are visual representations of example of steps for registering a scanned model of a patient's dentition and library arch form.

FIGS. 15-16 are examples of visual representations of steps included in a process of designing a restoration.

FIGS. 18-19 are examples of visual representations of a restoration being designed by a dental restoration design program.

While the above-identified drawings set forth presently disclosed embodiments, other embodiments are also contemplated, as noted in the detailed description. This disclosure presents illustrative embodiments by way of representation and not limitation. Numerous other modifications and embodiments can be devised by those skilled in the art which fall within the scope and spirit of the principles of the present disclosure.

DETAILED DESCRIPTION

Exemplary embodiments of methods and systems for designing dental restorations are provided. The computer-implemented methods of designing dental restorations described herein use an electronic image of at least a portion of a patient's oral situation as a starting point for the design process. Using the electronic image, a computer-implemented dental restoration design system is used to design a suitable dental restoration and to provide instructions to a restoration fabrication machine, such as a mill. The fabrication machine is then used to produce the dental restoration, which may then be installed into the patient's mouth by the dentist.

An initial step for the computer-implemented methods described herein is to provide an electronic image of at least a portion of the patient's oral situation. In some embodiments, the electronic image is obtained by a direct intraoral scan of the patient's teeth. This will typically take place, for example, in a dental office or clinic and be performed by a dentist or dental technician. In other embodiments, the electronic image is obtained indirectly by scanning an impression of the patient's teeth, by scanning a physical model of the patient's teeth, or by other methods known to those skilled in the art. This will typically take place, for example, in a dental laboratory and be performed by a laboratory technician. Accordingly, the methods described herein are suitable and applicable for use in chairside, dental laboratory, or other environments.

In a laboratory environment, an electronic image is typically obtained by scanning a physical impression taken of the patient's teeth, or by scanning a physical model of the patient's teeth that has been prepared, for example, from a physical impression. Details of these processes are beyond the scope of the present description and will be understood by those skilled in the art of dental restoration design and manufacturing.

For chairside applications, there are several systems and methods for acquiring electronic image information from a patient. A typical system includes an intra-oral scanning system. There are several intraoral imaging technologies and products that are currently available, including CEREC® (Sirona), E4D (D4D Technologies), True Definition Scanner (3M ESPE), Trios® (3Shape), and iTero™ (Cadent/Align Technology, Inc.). A preferred intra-oral scanning system is the FastScan® intra-oral scanning system manufactured by IOS Technologies, Inc. of San Diego, Calif.

Figure 1:
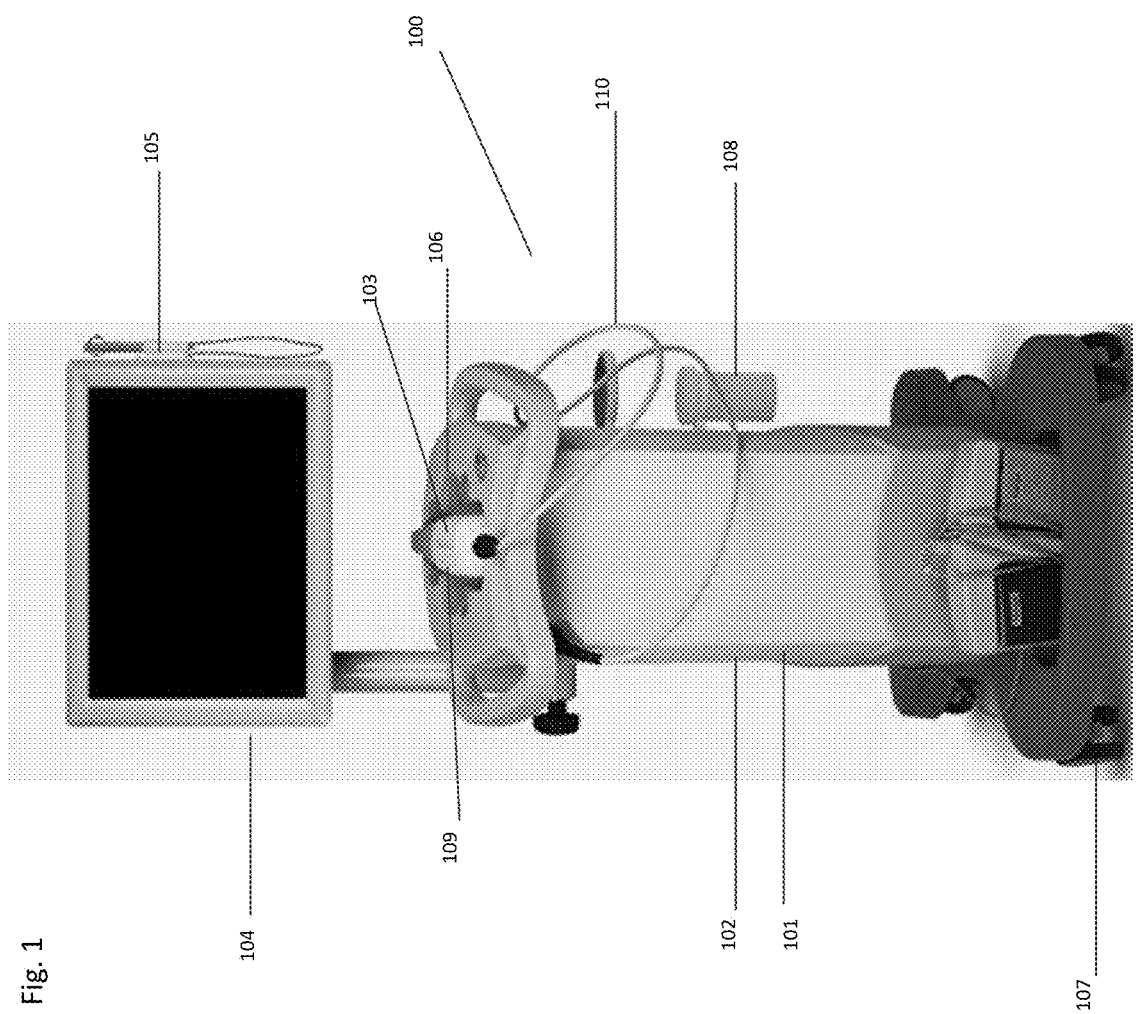
FIG. 1 is a front view of an embodiment of an intra-oral scanning system.

FIG. 1 shows an embodiment of an intra-oral scanning system 100 suitable for use with the methods for designing dental restorations described herein. The illustrated intra-oral scanning system 100 includes a base unit 101 that serves as a housing for a microprocessor or computer 102, a scanning device 103, and a user interface in the form of a touch screen 104. In the embodiment shown, the system 100 also includes a user input device in the form of a stylus 105 that interfaces with the touch screen 104 to allow the user to interact with the system 100. Additional features shown in the FIG. 1 embodiment include a cradle 106 located on an upper surface of the base unit 101 for storage of the scanning device 103, wheels 107 to allow the base unit to be easily moved by the user, and an optional disinfectant container 108.

The scanning device 103 includes a wand 109 with a probe having a profile and size that provides sufficient clinical access to obtain suitable intra-oral images of a patient's oral situation with little or no discomfort to the patient. The wand 109 is connected to the computer 102 by a cord 110.

Once the patient's dentition has been prepared, a digital impression of the prepared jaw is captured using the scanning system 100. In an embodiment, the preparation tooth is properly isolated from the surrounding gingiva using a two-cord retraction technique, as shown in FIGS. 2A-B.

Proper isolation of the preparation tooth from the surrounding gingiva may be helpful to obtain a clearer scan of the preparation margin. In FIG. 2A, two gingival retraction cords 201, 202 have been inserted between the patient's preparation tooth 203 and the surrounding gingiva 204. As shown in FIG. 2B, just before scanning, the top retraction cord 201 is removed to provide the maximum retraction and the bottom retraction cord 202 is left in place to control bleeding. In some embodiments, an intraoral spray is used to coat the preparation tooth and neighboring and opposing teeth prior to scanning.

In an embodiment, a plurality of scans (e.g., 3-5 scans per quadrant) are performed in order to obtain a suitable image of the patient's anatomy. For example, an occlusal, lingual, and buccal scan may be taken of both the preparation and the opposing jaws. Then, a single scan with the jaws in occlusion may be taken from the buccal perspective to establish the proper occlusion relationship between the preparation jaw and the opposing jaw. Additionally, in some embodiments, interproximal scans are added to capture the contact areas of neighboring teeth.

Further details about the scanning device 103 and its methods of use are beyond the scope of the present disclosure, and are therefore not described in detail herein. Once the scanning process is completed, the scanning system 100 will assemble the plurality of scans into a digital model of the preparation tooth and its surrounding and opposing teeth, as shown, for example, at 300 in FIG. 3. In the embodiment shown, the scans of the preparation jaw 301 and the opposing jaw 302 are shown in a first presentation (e.g., in a first color) and the bite scan is shown in a second presentation (e.g., in a second color). The bite scan should be registered to the scans of the preparation jaw 301 and opposing jaw 302 and be overlapping, as shown in FIG. 3. If so, the model is in proper form and is suitable to be used to design a restoration to be used on the preparation tooth as seen in FIG. 3 at 304.

Figure 4:
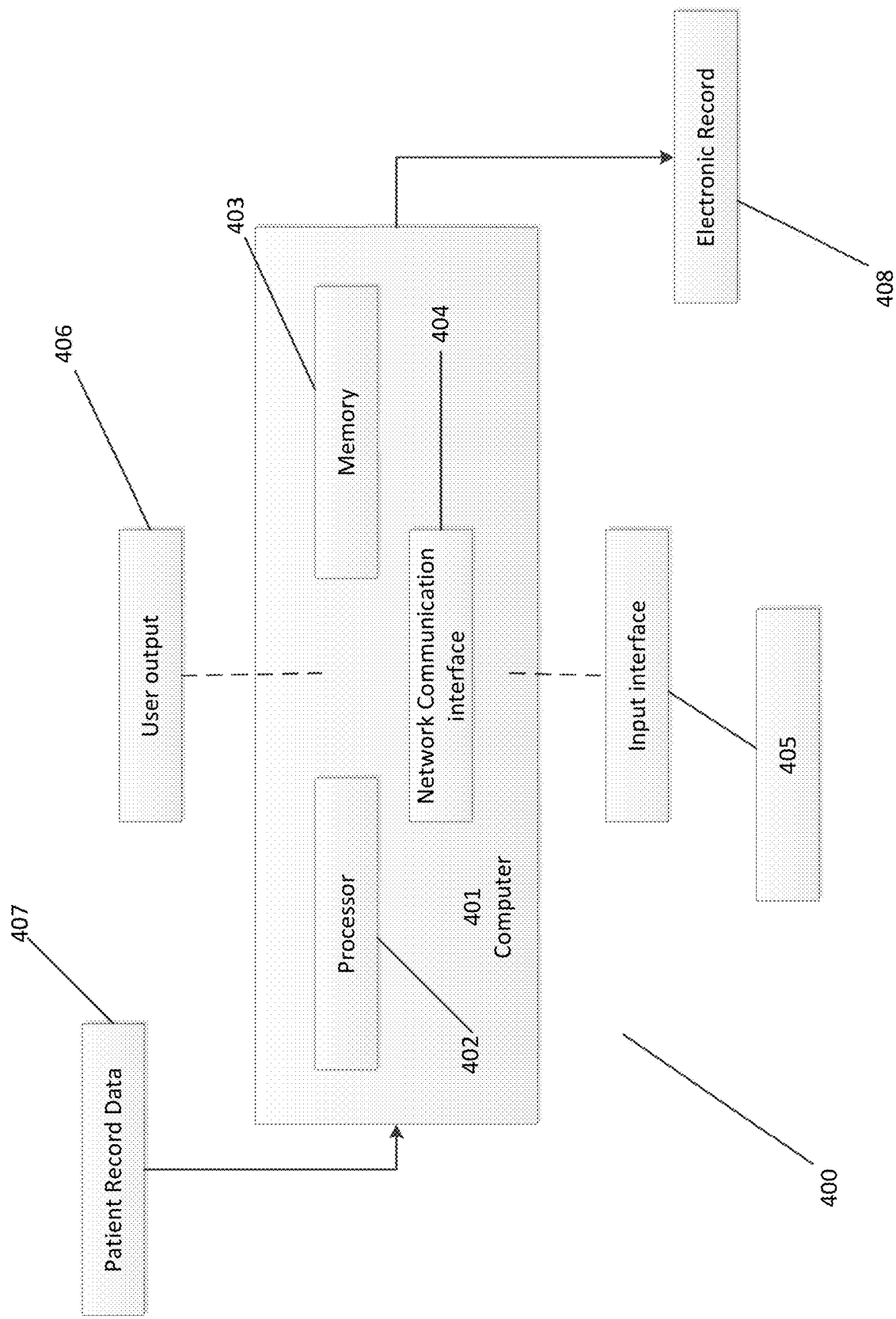
FIG. 4 is a block diagram of an embodiment of a dental restoration design system.

Referring now to FIG. 4, a simplified block diagram of an embodiment of a dental restoration design system 400 is described. The system 400 typically includes a computer 401, which may comprise a microprocessor, integrated circuit, or other suitable computing device. The computer 401 typically includes a processor 402, a memory 403, and a network or communication interface 404. The processor 402 communicates with a number of peripheral devices, including the memory 403 and the communication interface 404. The communication interface 404 provides the capability of transmitting information over a communication network or other data processing systems. An input interface or module 405 is electronically connected to the computer 401. The input interface 405 may comprise a keyboard, mouse, touchscreen, stylus pad, foot pedal, joy stick, or other suitable user input interface. Other types of user interface input devices, such as voice recognition systems, may also be used. A user interface output device, such as a monitor 406, is also provided. The interface output device may also include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

The memory 403 maintains the basic programming, commands, and other software that provide the functionality of the system 400. The memory 403 typically includes a number of memories including a main random access memory (RAM) for storage of instructions and data during program execution and a read only memory (ROM) in which fixed instructions are stored. A file storage subsystem may provide persistent (nonvolatile) storage for program and data files, and typically includes at least one hard disk drive and at least one floppy disk drive (with associated removable media). There may also be other devices such as a CD ROM drive and optical drives (all with their associated removable media). Additionally, the system may include drives of the type with removable media cartridges. The removable media cartridges may, for example be hard disk cartridges or flexible disk cartridges. One or more of the drives may be located at a remote location, such as in a server on a local area network, in a cloud data center, or at a site on the Internet's World Wide Web.

Data in the form of a patient record 407 from the intra-oral dental scanning system 100 is delivered to the dental restoration system computer 401. In some embodiments, the patient record 407 includes identification information and an electronic model of the patient's dentition, as described above. Once the restoration is designed, data in the form of an electronic record 408 that includes the restoration design is delivered to a fabrication system, such as a mill, as described more fully below.

Lining the Margin to Design and Fabricate the Restoration

Turning next to FIGS. 5A-5D, a method for designing a dental restoration is performed using a computer program maintained on the design system 400 described above. The monitor 406 or other screen is used to view the user interface of the program, and the input interface 405 is used to perform commands, such as selecting features and modifying features viewed on the monitor 406. In the description that follows, manipulation of the virtual dental model using a computer mouse as the input interface 405 will be described. It should be understood that other input interface 405 devices may be used in alternative embodiments of the systems and methods described. The program performs calculations or shows the changes on the monitor 406 corresponding to the commands the user has made.

Figure 5A:
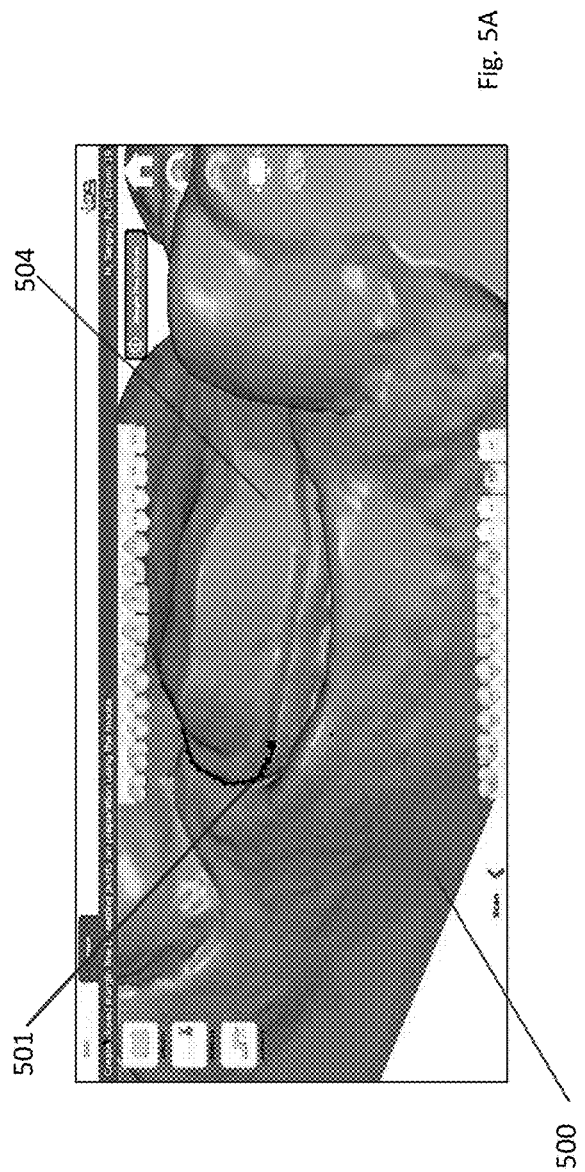
FIGS. 5A-5D are examples of visual representations of the virtual three dimensional model of FIG. 3, illustrating a margin lining process.

In a first step of the method, shown in FIG. 5A, the scanned model 500 of the patient record is presented on the monitor 406. The scanned model 500 includes a virtual representation of the preparation tooth 504, the surrounding gingiva, the neighboring teeth, and the opposing teeth. The margin 501 of the preparation tooth is identified on the model. Scrolling the center mouse wheel zooms the model 500 in and out. By placing the pointer on a specific area of the model and scrolling, that area can be enlarged. Pressing the mouse wheel and moving the mouse will rotate the model 500 around the pointer position. Pressing the right mouse button and moving the mouse will pan the model 500 on the screen. And finally, the left mouse button is used to select the various tools and objects on screen.

To begin lining the margin 501, the user may zoom in on the margin 501 and rotate the model 500 so that the contour of the margin line can be easily seen. The user places the cursor over a point on the margin 501 and presses the left mouse button. This will place the first margin point. The program will then attempt to follow the contour of the margin 501 as far as it can, based upon the quality of the scanned image. The user then places additional points along the margin 501 to complete the path.

Figure 5B:
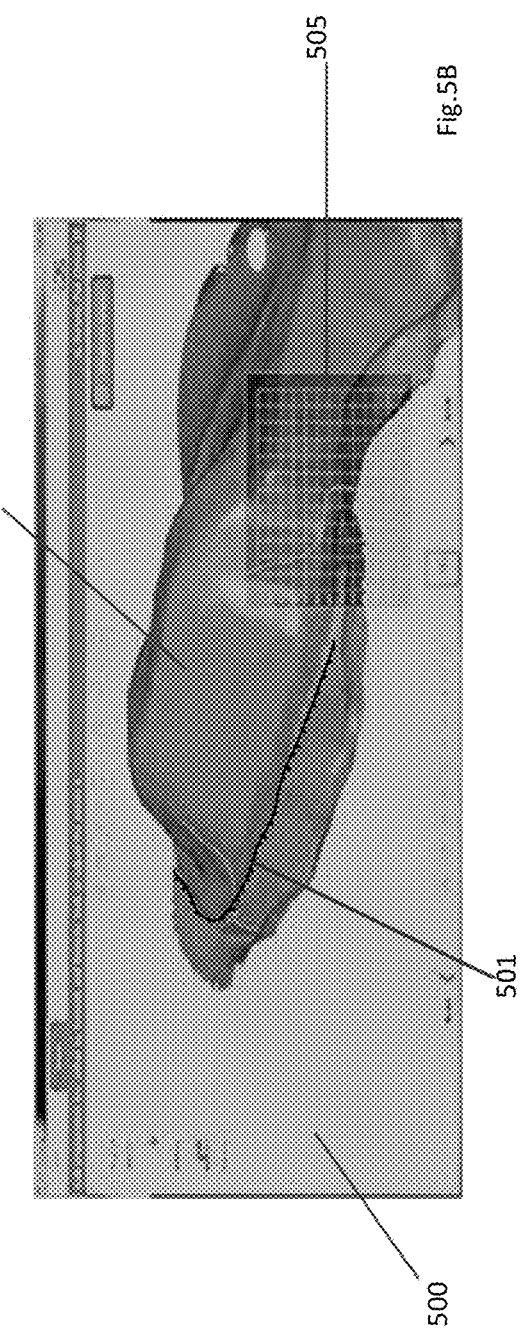

Once the margin 501 has been closed, the user can move to individual points. As shown in FIG. 5B, in an embodiment, when a point is selected a cross-section window 505 opens to help the user identify the proper placement of the point on the margin 501.

Figure 5C:
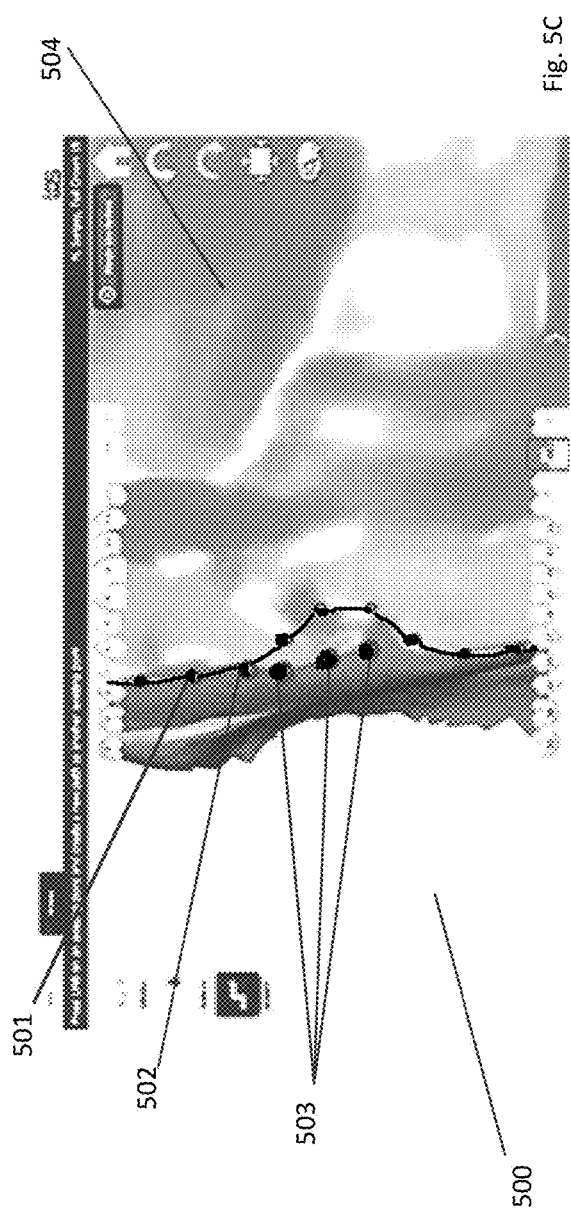

Turning to FIG. 5C, if a large section of the margin 501 needs to be relocated, a reroute tool is provided to provide the relocation. The user places a new point 502 on the last good point of the existing margin 501 and then place new points 503 as desired. The rerouted path is terminated on an existing point of the existing margin 501.

In an embodiment, a smoothing tool is provided to generally relax and smooth the entire margin.

In some instances, a scanned image may contain artifacts that do not belong on the model. These artifacts may result from bubbles of saliva, excess powder, or other materials that were present on the patient's dentition during the scanning process. These artifacts can be removed using a bubble tool provided with the program. To engage the bubble tool, the user clicks on the bubble tool icon, which causes an indicator (e.g., a colored circle) to appear on a portion of the model 500. The user then places the indicator over the artifact and presses the left mouse button. The size of the area affected can be changed by clicking on an edit influence button then moving the mouse with the left button pressed. The area to be effected will be indicated by the size of the indicator represented on the model.

Figure 5D:
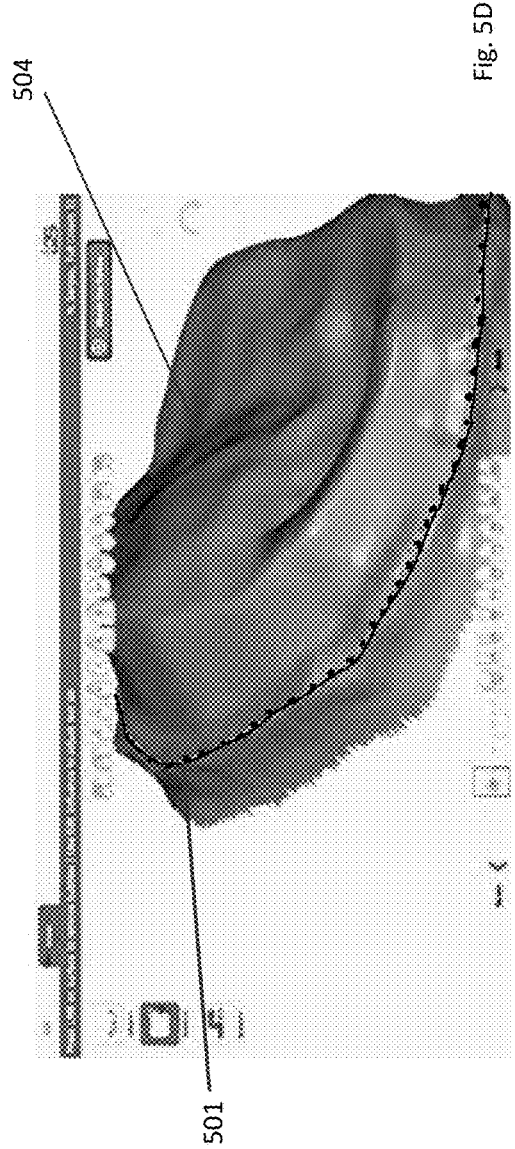

When the full margin 501 line of the preparation tooth 504 is completed, it will be represented visually on the model 500 as shown, for example, in FIG. 5D. At this point, the user is able to begin the design of the restoration. In the embodiments described herein, the restoration is designed by taking into account the position of the tooth within the arch form, as described below.

Distance to Opposing Dentition

An optimal distance between the occlusal surface of a preparation tooth and the occlusal surface of opposing dentition is established as part of the restoration design to ensure optimal thickness for the restoration. The distance requirement may depend of factors such as the material selected for the restoration design, the amount of space required for adhesive to attach the restoration crown, as well as patient and doctor preferences. For example, some dental restoration materials have a greater minimal thickness requirement in the finished restoration than other materials, and therefore require a greater distance between the preparation tooth and the opposing dentition.

Figure 6A:
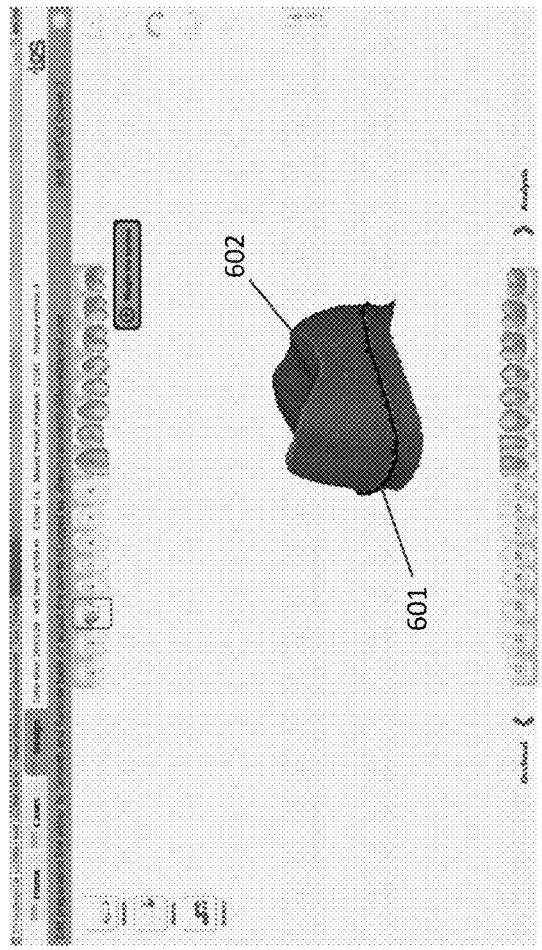
FIGS. 6A, 6B and 6C are representations of a virtual three dimensional model of a patient's dentition and an illustration of an embodiment of an offset surface component.
Figure 6B:
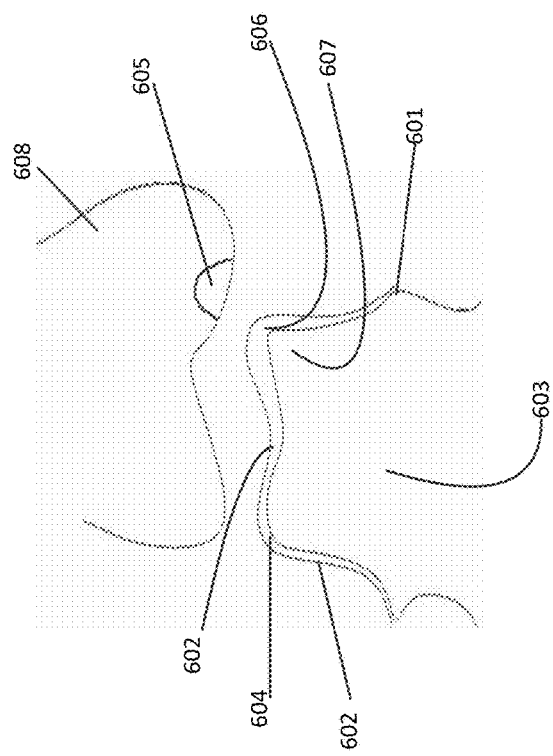
Figure 6C:
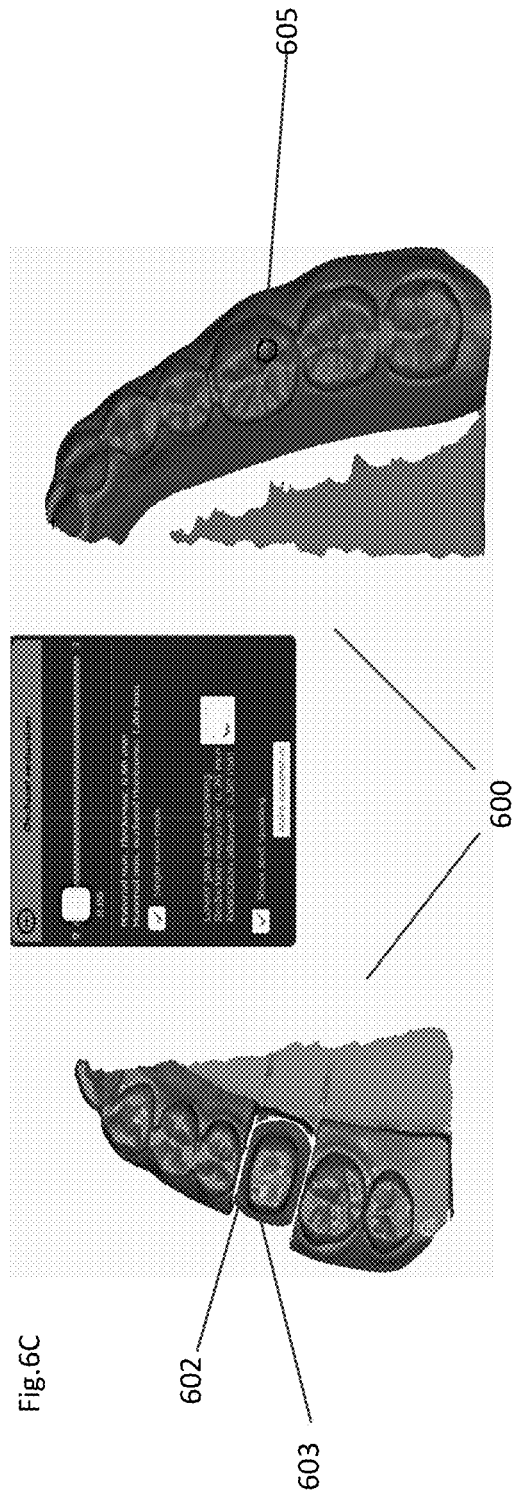

Referring to FIGS. 6A, 6B, and 6C, a method is provided for determining whether minimal distance parameter has been achieved between a preparation tooth 603 and opposing dentition 608. After a margin line 601 is identified, an offset surface component 602 is generated from the preparation tooth 603 of the scanned model 600. In one embodiment, as seen in the illustration of FIG. 6B, a cross-sectional representation of the offset surface component 602 approximately corresponds to the size and/or shape of the internal surface of a dental restoration design, such as a crown. The internal surface of a dental restoration is sufficiently larger than the preparation tooth, for example, to provide a space or offset 604 approximately equal to thickness of adhesive or attachment material to be placed between the preparation tooth and the dental restoration. Moreover, the internal surface of the dental restoration may be larger than the preparation tooth to provide a compensation for a minimum drill radius that is greater than a radius of a feature 607 of the preparation tooth. Thus, the size of the offset surface component 602 is larger than the preparation tooth 603 in an amount approximately equal to the adhesive or attachment material offset 604 that may be required to attach a dental restoration to a preparation tooth 603, and an amount for minimum drill radius compensation 606.

Figure 7A:
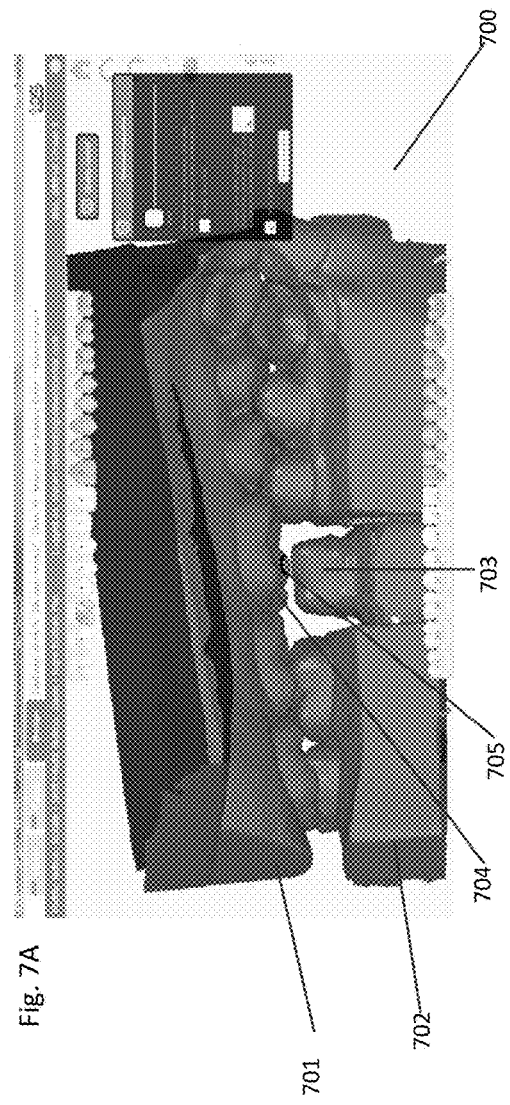
FIGS. 7A and 7B are representations of a virtual three dimensional mode of a patient's dentition and an embodiment of an offset surface component.
Figure 7B:
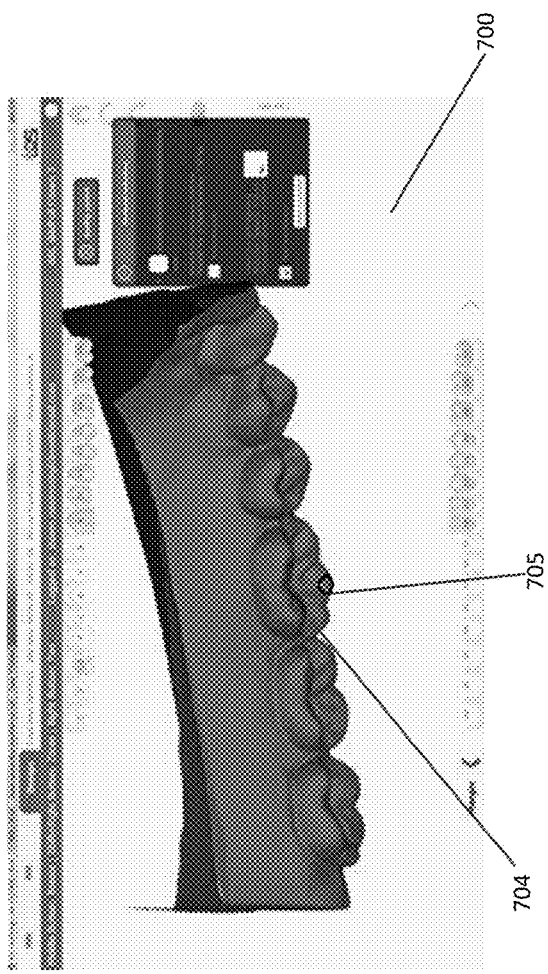

The upper arch 701 and lower arch 702 of the scanned model 700 are evaluated in occlusion as shown in FIGS. 7A and 7B to determine the sufficiency of the distance between the offset surface component 603, 703 and the surface of opposing dentition 704. The closest point(s) 605 between the offset surface component and the opposing dentition are evaluated to determine if the distance parameter for a given material have been met. In one embodiment, a point 705 where the distance requirement is not met is identified and optionally marked. In one embodiment, a point where the distance requirement between a preparation tooth and the opposing dentition is not met, may be visualized on an output device as a spot 705, as seen in FIGS. 7A and 7B.

In some embodiments where an established distance parameter between the preparation tooth and opposing dentition is not met, the distance may be increased by substituting the restoration material, modifying the opposing dentition, or modifying the preparation tooth. A method is provided whereby upon failure of a first minimum distance parameter, a proposal for a substitute material having different thickness requirements may be generated. Thickness parameters of alternate materials may be evaluated to determine if minimum distance requirements are met upon substitution of one material for another.

In a further embodiment, distance requirements may be achieved by reducing an area of the opposing dentition. A reduction proposal for reducing the opposing dentition may be generated. A spot or an area may be located on the opposing dentition, and the reduction area may be marked for visualization. This information may be communicated to the patient's doctor for a determination that the opposing dentition may be reduced as proposed, for example, by grinding, so that minimum thickness requirements can be met.

In some embodiments, it may be preferable to reduce portions of the preparation tooth to meet the distance parameter. Thus, a proposal for reducing the preparation tooth may be generated. In one embodiment, a location for reducing the preparation tooth to meet the minimum distance requirement is identified on the scanned model, optionally marked, for example, as a spot, and visualized by the dentist to reduce the area and achieve the distance requirements.

Figure 8C:
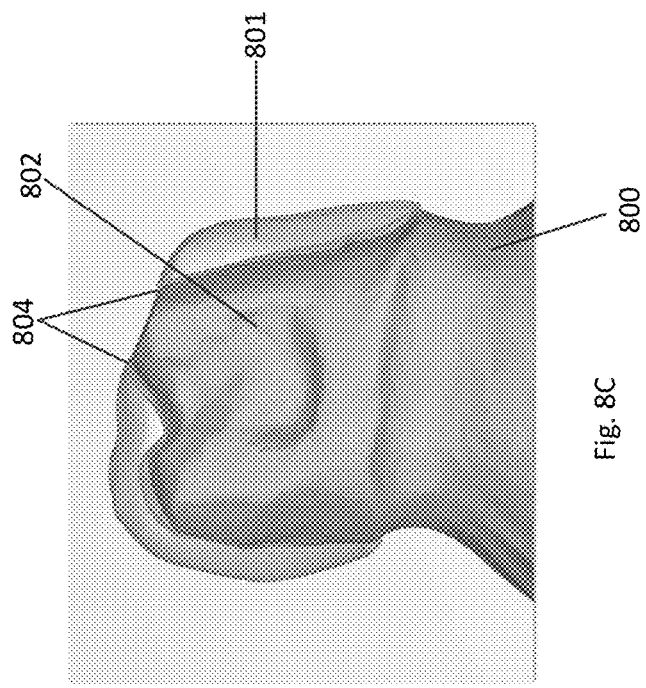
FIGS. 8A, 8B and 8C are representations of a virtual reduction coping model.
Figure 8A:
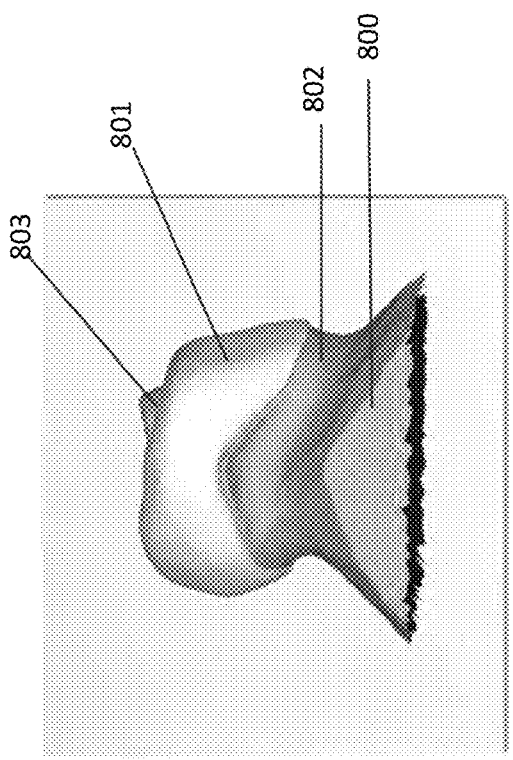
Figure 8B:
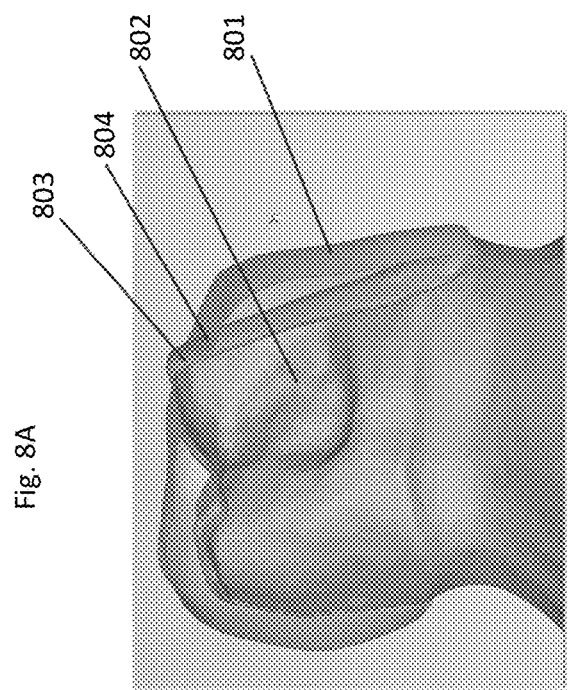

In a further embodiment, with reference to FIGS. 8A, 8B, and 8C, CAD processes may also be implemented to generate a reduction coping model 801 on the scanned model 800 of the patient's dentition. The reduction coping model 801 displays the protrusion area 803 of the preparation tooth 802 to be reduced to achieve minimal distance requirements. In one embodiment, a virtual reduction coping model 801 is formed by CAD processes, and a physical reduction coping may be generated therefrom by CAM processes, such as three dimensional printing or milling. A reduction coping formed by CAD and CAM processes, fits over the preparation tooth 802 and comprises a space 804 for the area of the preparation tooth to be reduced to protrude through. When placed on the patient's actual dentition, the reduction coping 801 may be used as a guide to reduce only the amount of preparation tooth 802 protruding through the space 804 as necessary to achieve the minimal distance requirements of the dental restoration. For example, as seen in FIGS. 8B and 8C, the protrusion area is reduced to the height of the reduction coping 801. Advantageously, reduction copings produced by CAD and CAM processes may be formed without the preparation of a physical model of the patient.

Placement of the Arch Form

Figure 9A:
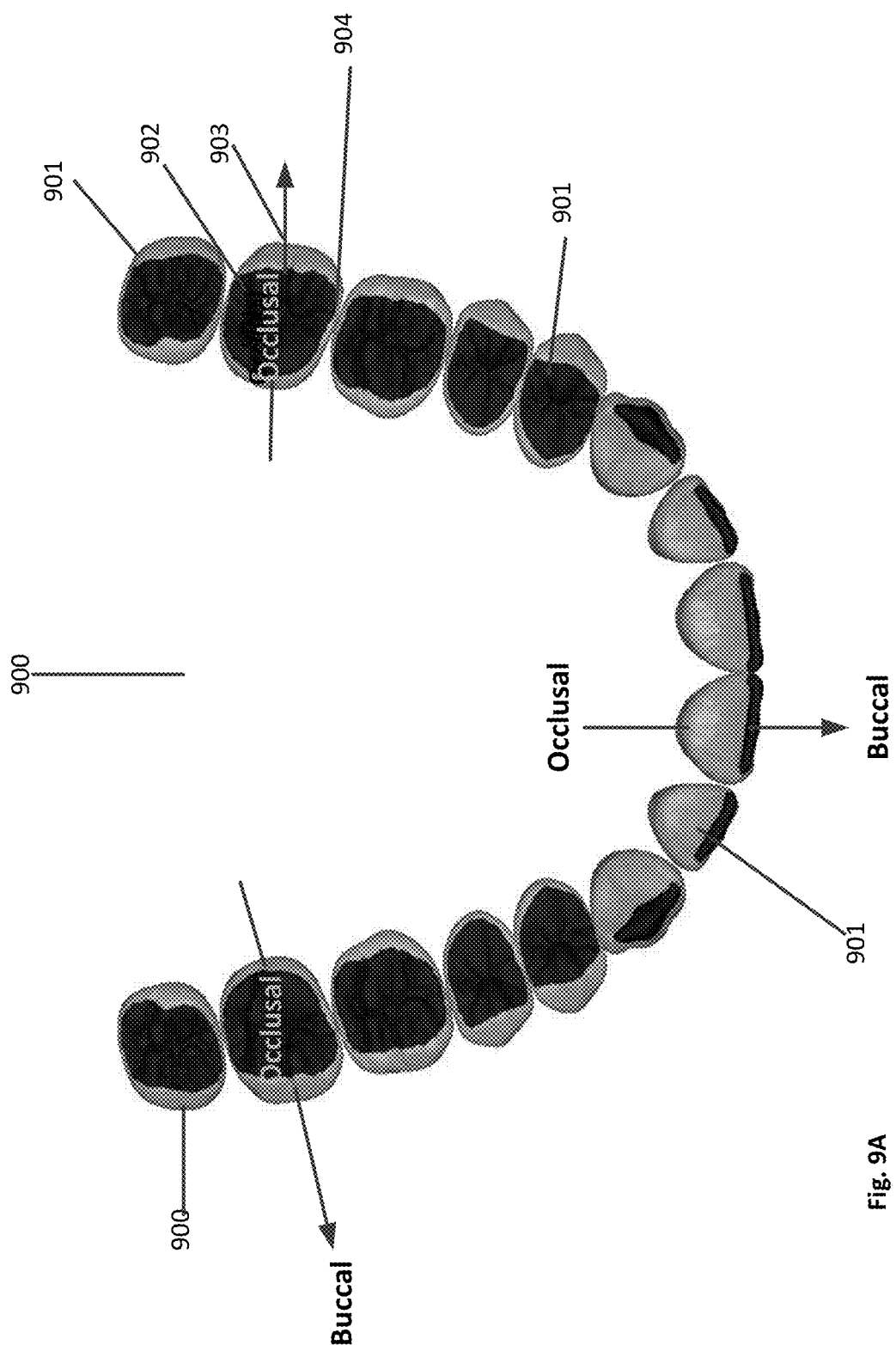
FIG. 9A is a top view of a virtual three dimensional model of a tooth library.
Figure 9B:
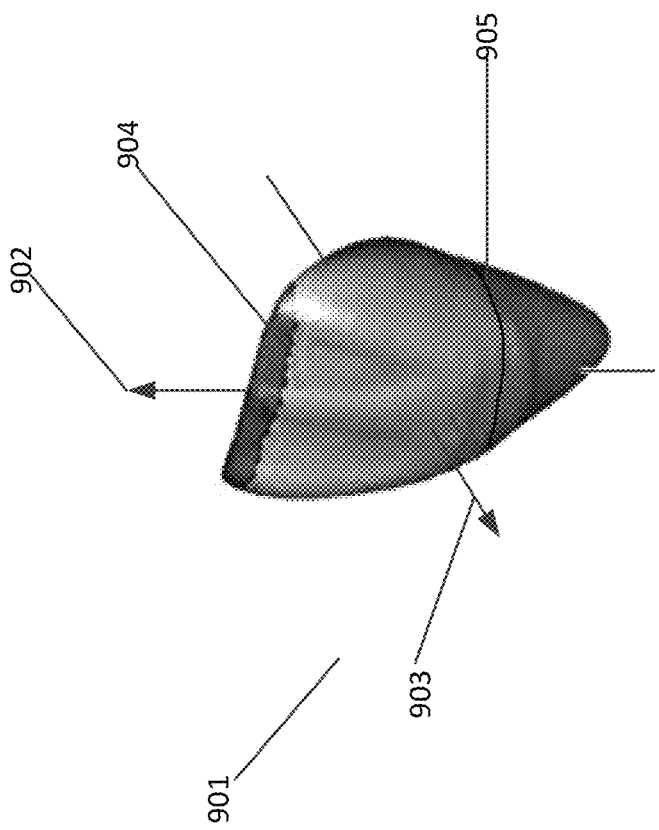
FIG. 9B is a perspective view of a tooth of the tooth library of FIG. 9A.
Figure 9C:
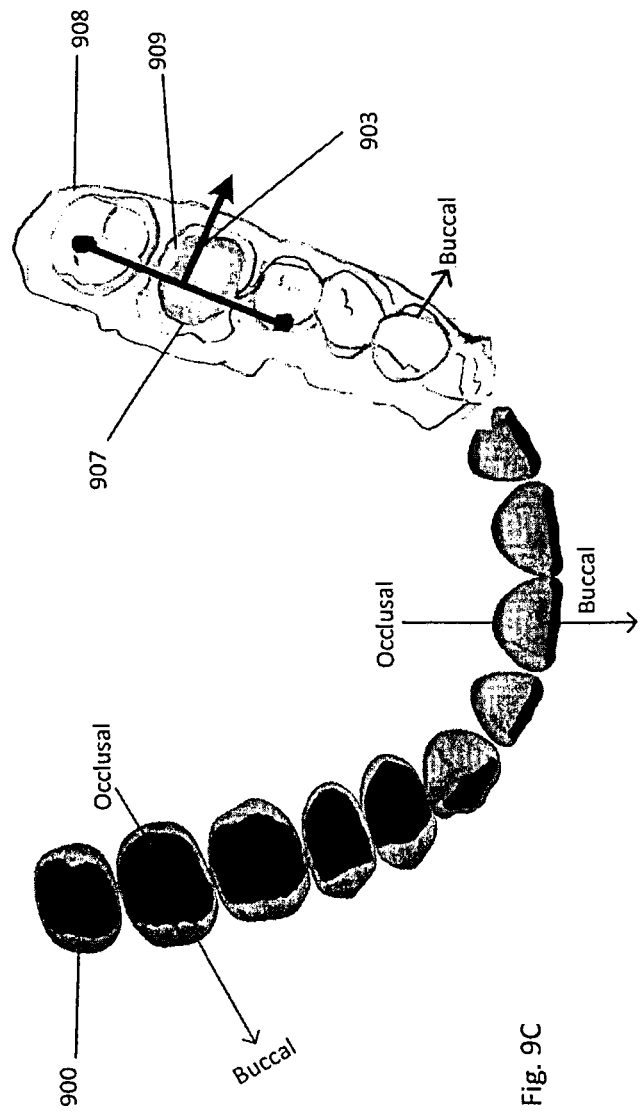
FIGS. 9C and 9D are examples of visual representations of steps included in a process of placing and aligning a tooth library with a virtual three dimensional model of a preparation tooth and surrounding dentition.

Referring now to FIGS. 5D, and 9A-9D, after the margin line 501 and 909 is identified on the model 500, the design program will search a tooth library 900 for the library tooth 901 that best matches the neighboring dentition of the preparation tooth 907 in the scanned model 908 and position it naturally, taking into consideration the natural structure of the arch 906 within which the tooth 901 is located, as discussed below. The tooth library 901 includes individual tooth shapes, with each tooth having several landmarks and directions. As shown in FIGS. 9A and 9B, each tooth 901 has an indicated occlusal direction 902, buccal direction 903, an indicated upper portion 904, and a separator line 905 that divides the tooth 901 between its crown and root. In one embodiment with reference to FIG. 9A, library teeth have an initially alignment in a library arch form corresponding to the anatomical curvature of teeth within a mouth, providing an overall library arch form shape or curvature. In one embodiment, the library teeth are aligned in a library arch form having an overall shape that corresponds to an ideal dental arch curvature.

In an embodiment, placement of the library arch form 906 described above includes at least the following four steps:
Initial placement of the library arch form 906 based upon the preparation tooth position, buccal direction 903 and occlusal direction 902;
Fitting the library arch form 906 to the scan;
Improvement of individual teeth positions of the library teeth relative to the scan; and
Interpolate positions of the library teeth for every preparation using neighbors.
Each of these steps is described in more detail below.
Initial Placement of the Arch Turning to FIGS. 9C and 9D, the first step relating to placement of the library arch form 906 is the initial placement of the library arch 906 based on the position of the preparation tooth 907, the buccal direction 903, and the occlusal direction 902. The initial alignment of the library teeth and the scan is based on the following criteria:
Tooth number of the preparation tooth 907;
Occlusal direction of the scan;
Buccal/facial direction of the preparation tooth 907; and
Occlusal and buccal/facial directions of the library tooth 901.

The center of the margin line 909 on the model/scan 908 is aligned with the center of the selected library tooth 901, with both pairs of directions defined by the orientation of the tooth library 900.

Library teeth which are not present in the scan (not selected in the tooth chart, or marked as "missing with gap") are excluded from the following steps. In addition, if there are some teeth marked as "missing without gap", those teeth are removed from the library arch form 906 and the library arch form is packed to close any gaps.

Figure 9D:
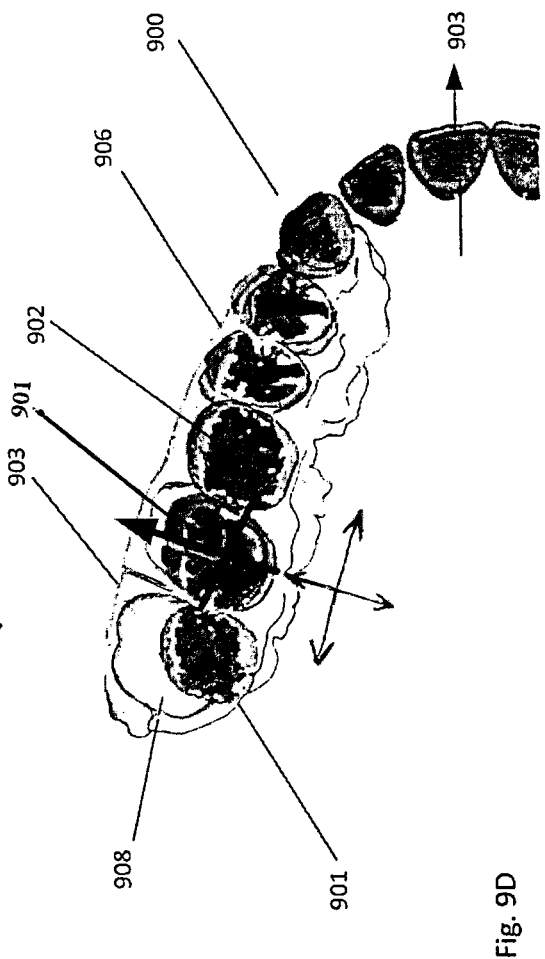

If the model/scan data 500 has more than one preparation, then only one of the preparations would be used for initial placement. If both jaws have preparations, then each jaw is placed independently based on its preparations defined for that jaw.
Fitting the Arch to the Scan Next, as shown in FIG. 9D, in some embodiments, after initial placement of the arch 906, the dental restoration program is used to try to find a better position for the arch 906, using the following criteria:
mesial shift (5 steps by 0.5 mm per shift);
uniform scale (relative to prepline center) (0.92 . . . 1.08);
buccal shift (5 steps by 0.5 mm per step); and
rotation around occlusal axis with the rotation center at prepline center (3 steps by 2.5 degrees per step).

On every iteration, the arch form 906 is shifted in one of the 4 directions, and the snapping quality (defined below) is calculated at each shift. After all iterations the position with the best snapping quality becomes the result of this step.

Figure 10:
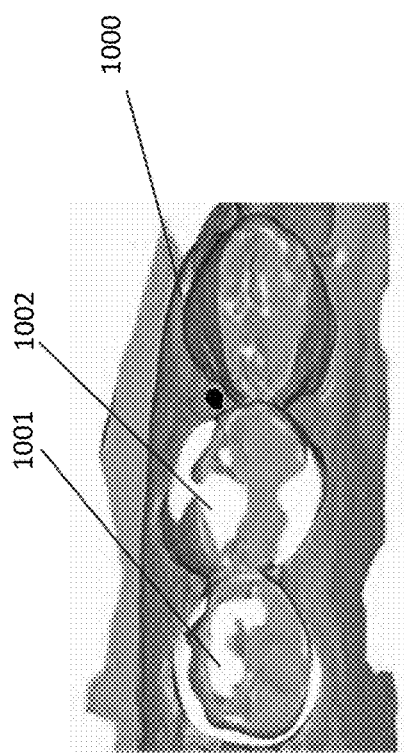
FIGS. 10 and 11 are visual representations of examples of steps in a process of aligning a library tooth to a virtual model of a preparation tooth and surrounding dentition.

As defined herein, the "snapping quality" for the arch is based on the average distance from the surface points of the teeth in the tooth library to the scan surface; the less the average distance, the greater is the snapping quality.
Improvement of Individual Teeth Positions In some embodiments, several attempts are made to align each tooth (for example, 1001 and 1002) to the scan 1000, as shown, for example, in FIG. 10. In some embodiments, a portion of the library arch form that corresponds to the scanned model of the patient's dentition may be separated or segmented from the remainder of the library arch form for further modification of the library arch form and library teeth.

Figure 11:
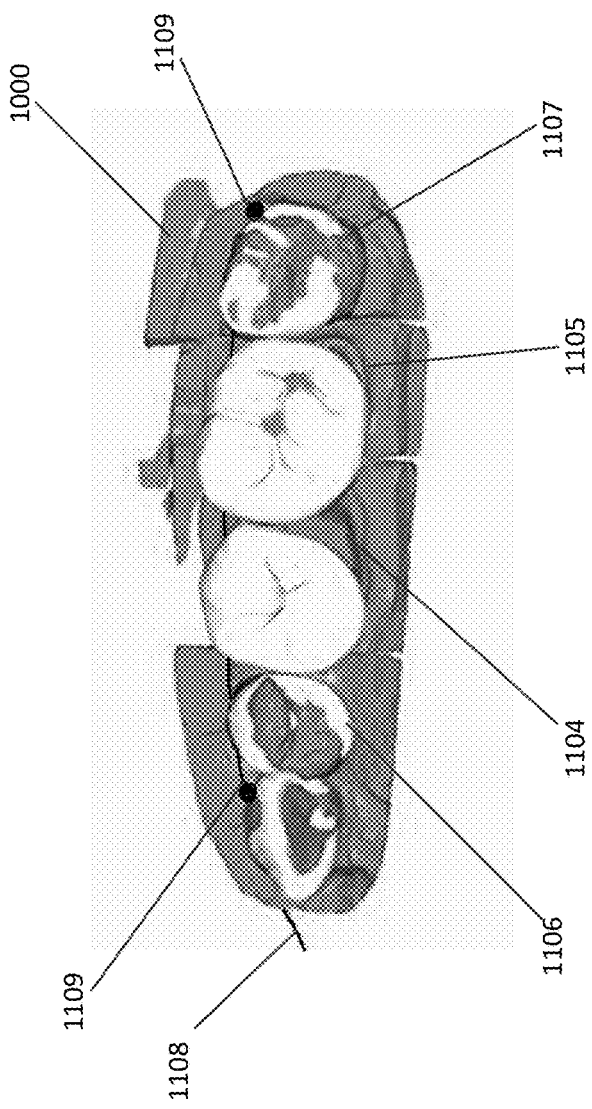

The dental restoration program searches for the best tooth position in 7 dimensions (3 motions, 3 rotations, +1 scale). In particular, every tooth included in the scan optimizes its position using the following 7 criteria:
Buccal shift,
Occlusal shift,
Mesial-Distal shift,
Torque angle,
Tip angle,
Rotation angle, and
Scale On each optimization step, the tooth is moved in all directions (+/−1 mm buccal, +/−1 mm occlusal, +/−1 mm mesial-distal shift, +/−1 degree torque angle, +/−1 degree tip angle, +/−1 degree rotation angle, and +/−1% scale). Each time the snapping quality is estimated. In case a better position is not found, the motion step becomes 2 times smaller until it reaches a defined epsilon value to interrupt the iterations.
Interpolate Positions of the Library Teeth for Every Preparation Using Neighbors As shown in FIG. 11, since the tooth being restored—the preparation tooth 1104—does not have anything to snap to, its position is interpolated from the given positions and orientations of its neighbors. For example, if the scan 1100 has two preparations in a row (for example, 1104 and 1105), every tooth has interpolated transformation (position, orientation, and scale) with greater weight of the closer neighbor. For example if preparations 1104 and 1105 have neighbors 1106 and 1107 with a good snapping quality, then library tooth for preparation 1104 will have its position interpolated from 64% from tooth number 1106 and 33% from tooth number 1107.

If the preparation has only one neighbor with good snapping quality then the proposal for this preparation would be centered on the margin line center and get oriented as the only neighbor.

After interpolation every preparation is scaled to close gaps with neighbors and fit into space.

In one embodiment, where the design program placement of the library arch form does not result in an optimal placement relative to the scan of the patient's dentition, a user may adjust placement of the library arch form. In one embodiment, library teeth are associated with a virtual wire and are arranged on the virtual wire 1108, as seen in FIG. 11. A user may manipulate the wire with a user input interface tool by grabbing a wire point 1109 also associated with the wire, for example, by clicking on the point with a mouse. Upon moving the point, the wire moves resulting in movement of the library teeth on the wire, and the user may attempt to improve the placement position of the library arch form in relation to the scanned model. Thus, in one embodiment, the user manually adjusts the arrangement of the library teeth or the curvature of the library arch form to conform more closely to the natural arch of the patient's dentition.

Automatic Process for Placement of Library Arch Form

In some embodiments, automatic computer-implemented process(es) in the form of a program, programs or modules automatically implement one or more algorithms provide for a computer automated dental restoration design proposal, with minimal user interaction but which provide optional opportunities for user input where desired. With reference to the workflow outlined in FIG. 12, a computer implemented method 1200 for generating a dental restoration design proposal comprises processes for automatic feature detection 1201 on a scanned model, automatic arc fitting to the detected features 1202, automatic scaling of the library arch form to the scanned model 1203, automatic rigid registration 1204 and/or non-rigid registration 1205 of the library arch and the scanned model, and restoration design proposal 1206 processes. Computer programs or modules may optionally be included that evaluate the success (1207 and 1208) of the automatic rigid registration 1204 and non-rigid registration 1205 of the library arch form to the scanned model, and automatically prompt a user to provide input if success is not achieved. In further embodiments, an optional, computer-implemented process for scan segmentation may also be implemented.

Cusp Detection

In one embodiment, a dental restoration design proposal process comprises a computer-implemented process for the initial placement of the library arch form 906 to the scanned model based on a correspondence of detected features of the scanned model and the library arch form. In one embodiment, a feature detection algorithm is implemented for automatically detecting features present on the patient's scanned model. One method comprises detecting cusps located on the scanned model of a patient's teeth. In one embodiment, cusps are detected on only a portion of the patient's teeth, such as the two teeth that are neighboring, or most proximate to, the preparation tooth. In one embodiment, cusps are detected on at least one neighboring tooth located on one side of a preparation tooth, and at least two neighboring teeth located on the other side of a preparation tooth.

For use herein, cusps 1301 and 1302 include the occlusal or incisal eminence on a tooth, as depicted in FIGS. 13A-F. Generally, canine teeth, also referred to as cuspids 1303, each possesses a single cusp, while premolars, also referred to as bicuspids 1304, typically possess two or three cusps 1301 and 1302. Molars 1305 typically possess either four or five cusps.

One method for computer implemented detection of cusps of teeth comprises an algorithm for locating peaks by computing curvature maxima within the scanned model. In this method, occlusal curves and occlusal surfaces 1306 of the teeth may be identified by the detected cusps 1301 and 1302. In an alternate embodiment, an algorithm may be used for a computer implemented method of detecting cusps that calculates the height of a peak that is in the occlusal 1306 direction of a tooth. For the convenience of a user, computer detected cusps may be identified and marked as points 1301 and 1302 as seen on the representation of a scanned model 1300 of a patient's upper jaw 1307, and a scanned model of a patient's lower jaw 1308 having the preparation tooth 1309.

Feature detection algorithms may be implemented having rules that limit the density of points to be identified on the scanned models, or that limit the number of points to be identified in an area of the scanned model that correspond to the anticipated number of cusps. Where the preparation tooth has been modified to accommodate a dental restoration, thereby eliminating or reducing natural cusps, a rule may be implemented that excludes the preparation tooth from cusp identification and marking process steps.

In one embodiment, upon viewing the results of the automatic feature detection on a user output device 406, such as a monitor, a user may locate outlier points that have been improperly identified as cusps by the algorithm. A user may implement an input interface to remove outlier or stray points 1301 and 1302, to relocate misplaced points onto a cusp that the user visually identifies, or to place a point on a tooth cusp that was not automatically detected or identified.

Similarly, sets of cusp and/or the occlusal surfaces for the library teeth of the library arch form may be labeled and stored for later registration with the scanned model.

Arc Fitting

Figure 13A:
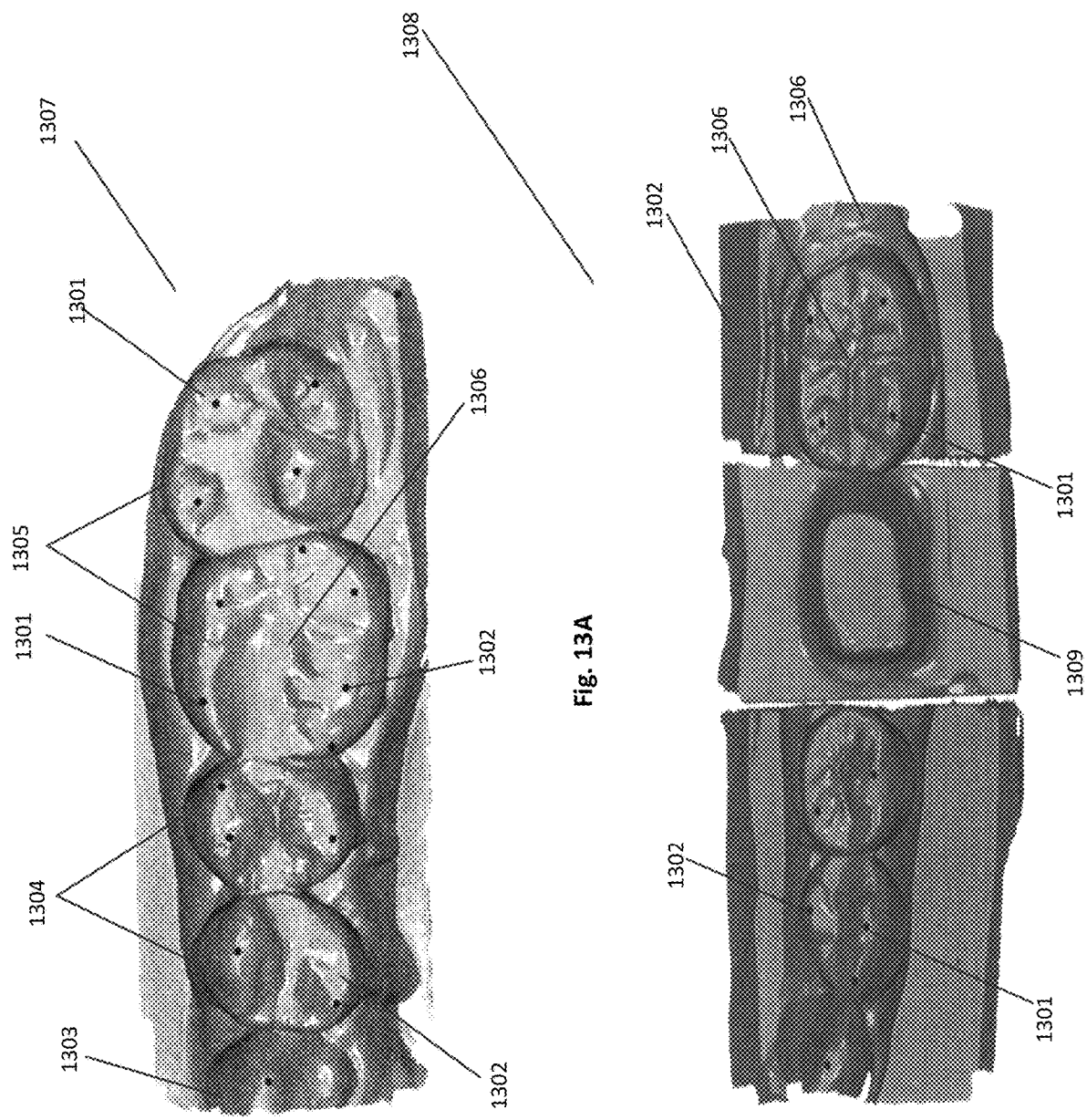
FIG. 13A is a representation of a scanned model of a patient's upper and lower jaw on which cusps have been identified.
Figure 13B:
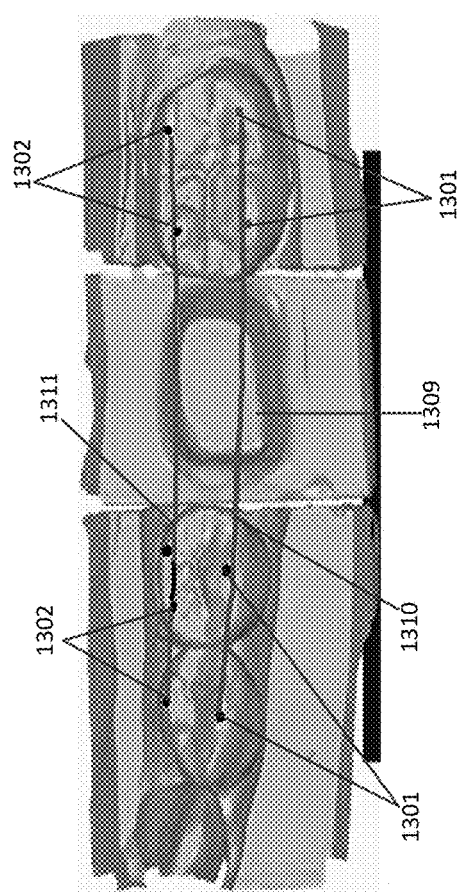
FIG. 13B is a visual representation of an example of steps for arc fitting on a scanned model.

In one embodiment, an arc is defined by computing the location of the identified features on the patient's scanned model. An arc fitting process may be used to fit an arc to detected features, such as the cusps of teeth. FIG. 13B illustrates a buccal arc 1310 that has been automatically calculated from buccally located cusps 1301 that were automatically identified on the teeth of a patient's scanned model by a computer-implemented process. Arcs may be calculated and fitted on the scanned model of the preparation tooth (shown) and, optionally, the scanned model of the opposing dentition. FIG. 13B further illustrates placement of a lingual arc 1311 that has been calculated from lingually located cusps 1302 identified on the patient's scanned model, and fitted to the lingual cusps. Buccal 1310 and lingual 1311 arcs may provide information relating to the general shape of the patient's anatomy which may be used to automatically register the library arch to the scanned model, providing a dental restoration design proposal that more closely approximates the natural shape and orientation of the tooth being replaced.

The method may also provide an option for user to visualize placement of the arcs on an output device 406 such as a monitor. In one embodiment, an option is provided for user input via a user input interface to adjust features of the arcs. For example, in one embodiment where a user visually detects that an arc on a scanned model is too short or is not well defined by the automatic process, a user may manually use an input device such as a mouse or a keyboard to adjust the location, curvature or length an arc of the scanned model.

Figure 13C:
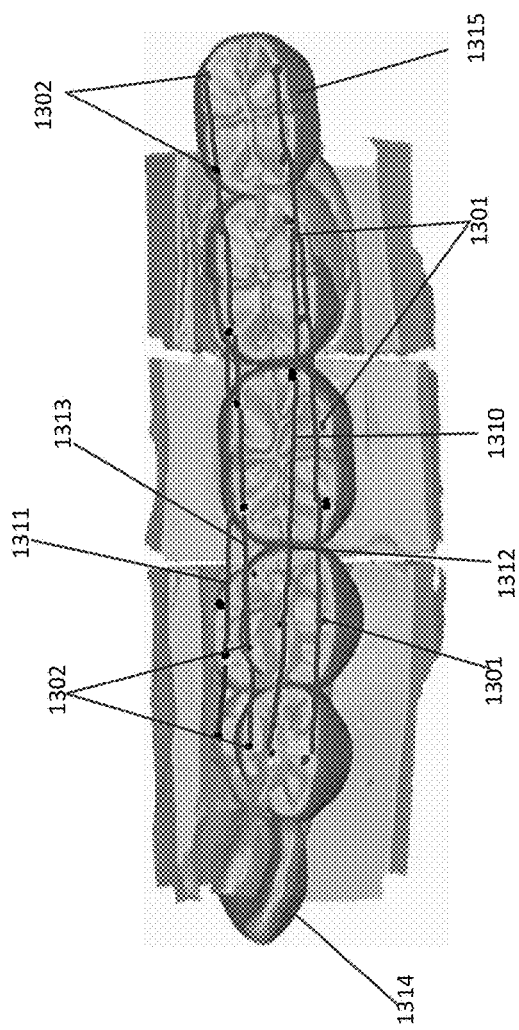
FIGS. 13C, 13D, 13E, 13F and 13G are visual representations of examples of steps of placing and registering a scanned model of a patient's dentition and a library arch form.

Similarly, a buccal arc 1312 and a lingual arc 1313 for the library arch form 1314 are calculated based on buccal cusps 1301 and lingual cusps 1302 of library teeth 1315, and fitted to buccally and lingually oriented cusps of the library teeth on the library arch form, as shown in FIG. 13C. The arcs of the library teeth are stored as data sets for use in registering the library arch form with the patient's scanned model.

Registration and Library Arch Form Scaling

Automatic registration of the library arch form to the scanned model may include both rigid 1204 and non-rigid 1205 registration processes. A rigid registration process comprises registering the library arch form and the scanned model without changing the shape of the library arch form. A non-rigid registration process comprises altering the shape of the library arch form to optimize correspondence with the scanned model. Both rigid and non-rigid registration processes may be done automatically via computer program modules, without input from a user.

A rigid registration process (FIG. 12 flow diagram at 1204) may comprise steps for the automatic registration of the library arch form and the scanned model by correspondence of the data sets for buccal and lingual arcs of each, without altering the orientation or location of the library teeth on the library arch form. With reference to FIGS. 13B and 13C, a library arch form 1314 may be approximately registered to the scanned model, for example, by overlapping or fitting the buccal and lingual arcs (1313 and 1312) of the library arch form to the buccal and lingual arcs (1310 and 1311) of the scanned model bringing points on the arcs into correspondence for registration without altering the overall shape of the library arch form.

In one embodiment, a library arch form that is to be registered with the scanned model may be resized or scaled to approximately correspond to size of the scanned model. A scaling factor may be obtained by calculating the average distance between the buccal arc and the lingual arc of the scanned model when measured at multiple points along the arcs, and similarly, calculating the average distance between the buccal and lingual arcs of the library arch at multiple points. The library arch scaling factor is computed as follows:

$$S=d_s/d_l$$

where $d_l$ is the average distance between the buccal 1312 and lingual 1313 arcs of the library arch form, and $d_s$ is the average distance between the buccal and lingual arcs of the scanned model.

Figure 13E:
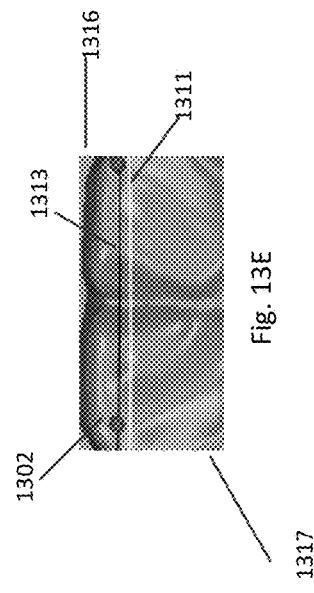
Figure 13G:
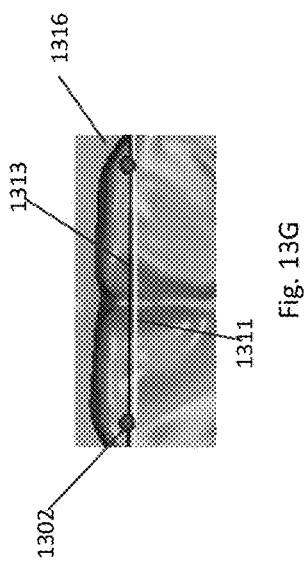
Figure 13D:
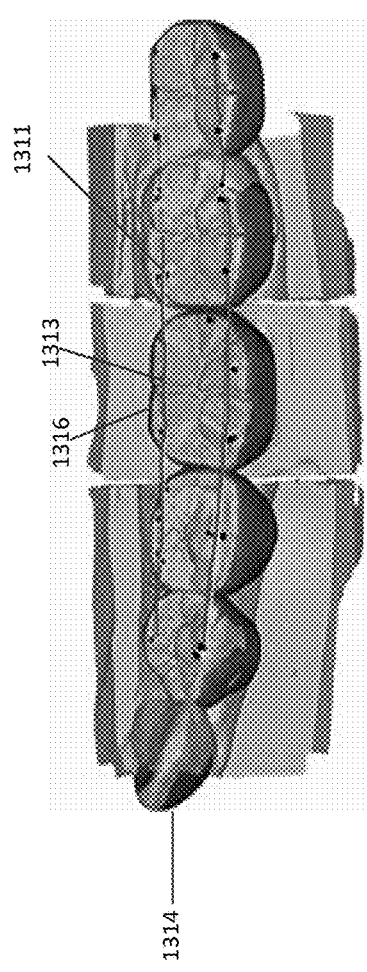

Buccal and lingual arcs (1312 and 1313) of the library arch form may be resized, or transformed with a scaling factor, to approximately correspond to the size of the arcs of the scanned model, thereby optimize positioning of the library arch form with the scanned model. FIGS. 13D and 13E illustrates a rigid registration process that comprises the automatic alignment of the library arch form 1314 to the scanned model. FIG. 13E, provides a zoomed in view of area 1316 illustrating one embodiment of a step of optimizing the correspondence of the lingual arc 1313 of the library arch form 1314 and the lingual arc 1311 of the scanned model, by scaling the library arch form to the approximate size of the scanned model based on the average distance between the buccal and lingual arcs of each. A gap 1317 between the lingual arcs of the scanned model and the library arch form, and/or a gap between the buccal arcs of the scanned model and the library arch form, may indicate that complete alignment of the library arch form and the scanned model has not been achieved by placement and resizing. In one embodiment, further modification may be performed to optimize correspondence.

Figure 13F:
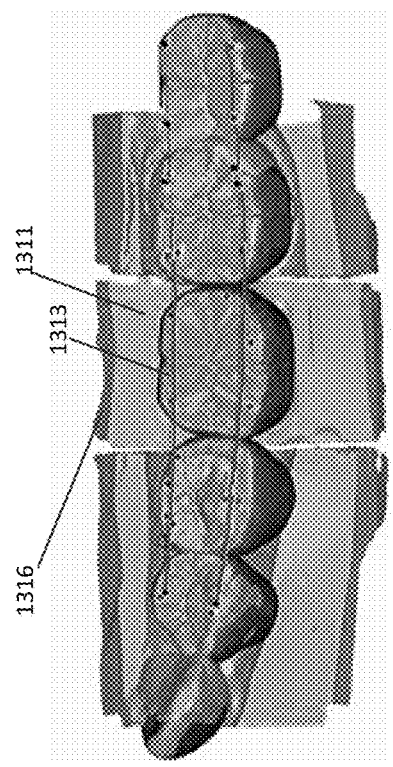

An automatic, non-rigid registration process (FIGS. 13F and 13G) may be applied to deform or warp the shape of the library arch form to reduce a gap between the arcs of the library arch form and the scanned model after an initial alignment step. Non-rigid registration 1205 processes may comprise applying a global and/or local deformation or warping step consistently across the entire library arch form. In one embodiment, a global warping process comprises deforming the library arch form to change the overall shape of the arch of the library arch form to increase or establish correspondences between points on the arcs of the library arch form and the scanned model. As seen in FIGS. 13F and 13G, the distance between the lingual arc 1313 of the library arch form and the scanned model is decreased after a non-rigid registration process is performed when compared to the distance between the arcs seen in FIGS. 13D and 13E.

A local deformation or warping process step may be applied to portions of the library arch form or individual library teeth snapping library teeth to the scanned model. As used herein, 'snapping' may be performed by establishing a snap tolerance level for the correspondence between sparse sample of points on the library arch form and the scanned model. The placement or shape of each library tooth may be deformed separately to establish greater correspondence between the corresponding tooth of the scanned model.

Figure 12:
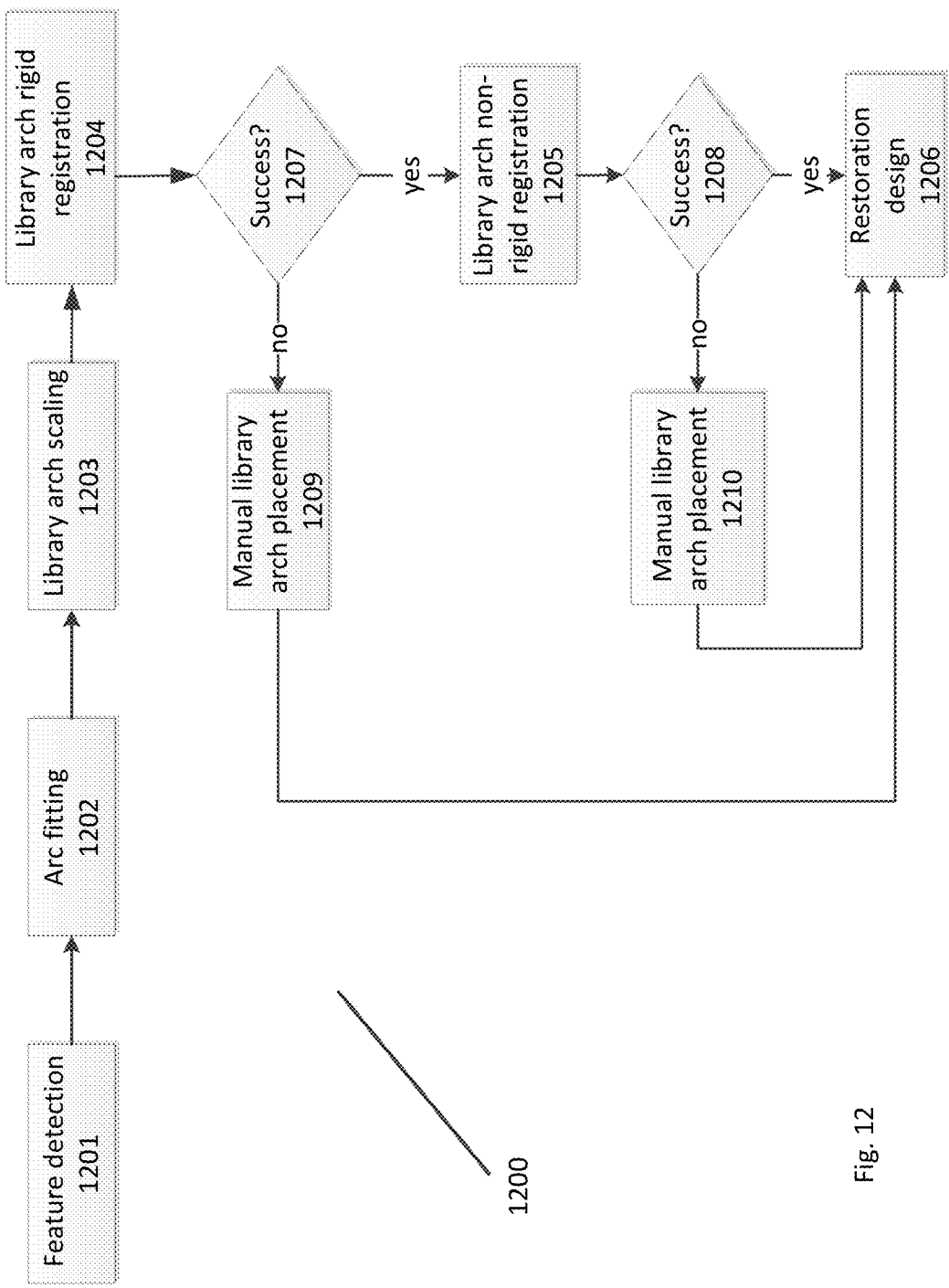
FIG. 12 is a work flow diagram of one embodiment of a computer implemented automatic process for designing a dental restoration.

Automated process steps for determining the success of the rigid and non-rigid registration processes may be implemented as shown in the diagram of FIG. 12 at 1207 and 1208. Algorithms may be implemented that indicate the level of correspondence necessary to proceed to the next module in the automated restoration process exemplified in FIG. 12. For example, the local deformation process may bring the correspondence between library teeth 1314 and teeth of the scanned model 1308 closer together, but may result in a lack of overall arch continuity, as seen in FIG. 14A. Reduced arch continuity may result in a loss of optimal teeth contact distances between teeth as seen by the space between teeth in FIG. 14A, or a scanned model tooth may be deemed missing.

Where a correspondence threshold between aligned points on the library arch form and the scanned model is not achieved after non-rigid registration, a rigid registration process may be automatically re-run starting from a first set of correspondence values achieved from a first or initial global and/or local deformation process. Thus, rigid registration and non-rigid global and local deformation processes may be repeated, optimizing correspondence between points on the lingual and buccal arcs of the library arch form and the scanned model. Multiple iterations of the global and local deformation processes may be automatically performed to refine the library arch form-scanned model registration to achieve optimal contact distances between teeth, and final positioning of the arch form, as seen in FIG. 14B.

Optionally, the automated registration process may be visualized by a user on a monitor. Where it is desirable for the user to manually assist in the registration process, manual procedures for library arch form placement, as described herein, may be performed. For example, upon failure of the automated library arch form rigid registration process 1204 to achieve an acceptable level of correspondence, a manual process 1209 for fitting the library arch form to the scanned model may be performed by a user using the criteria as described herein. After a user input step of manually placing the library arch, the automated process may be resumed for non-rigid registration process steps. Still further, upon failure of the automated library non-rigid registration process 1205 to achieve optimal correspondence, a manual optimization process 1210 for improving individual teeth positioning may be performed by the user according to optimization steps described herein.

After registration and optimization of the position of the library arch form to the scanned model, a design restoration is proposed for the preparation tooth.

Designing the Restoration

Based upon the selection of the library tooth 901 within the context of the arch form 906 described above, the dental restoration program will present a proposal for a restoration. This section describes processes for modifying the proposed restoration and transmitting the restoration design to a mill or other fabrication site for manufacturing.

For example, in one embodiment as shown in FIG. 15, the user can make gross adjustments to position before a library tooth 1501 is adapted to the die or to the neighboring dentition within an arch form 1506. An exact placement is not needed. Rather, the user provides general guidance so that the program can provide the best possible restoration proposal. Several manipulation tools are shown in the illustration shown in FIG. 15. The spheres 1502 above, below, and on each side of the library tooth 1501 are used to rotate the tooth. The arrows 1503 are used to scale the tooth. The bars 1504 are used to translate the tooth. Each of these tools may be accessed by the user by, for example, using the pointer under control of the mouse. After the user is satisfied with the general rotation, size and position of the library tooth 1501, the program will propose a restoration.

FIG. 16 shows the initial restoration proposal 1601 within an arch form 1606 that is provided by the dental restoration program. The user can control the visibility of the restoration 1601 the preparation jaw and the opposing jaw. Clicking on the tooth chart icon toggles the visibility of these items on and off. Double clicking on the tooth chart will make the item translucent.

The restoration 1601, as proposed, may or may not require further modification. If it does, it is preferable to make large changes first and then finish using an automated contact editing feature (described below) last to make final adjustments. In an embodiment, the dental restoration design program includes several programming tools (e.g., a free form tool, a smoothing tool, an add tool, a remove tool, and a move/rotate/scale tool) for making these large changes.

Large Modifications

In an embodiment, an initial modification is to the orientation and scale of the restoration 1501 or 1601. If changes are necessary, the user may use the Move/Rotate/Scale tool. The spheres 1502 are used to rotate the restoration, the arrows 1503 are used to scale the restoration, and the bars 1504 are used to translate the restoration. (See FIG. 15). Next, the user may review the buccal and lingual contours. Changes can be made with the Free Form or other tools. Cusp placement can be checked with the visibility of the opposing jaw turned on and adjustments can be made with the Free Form or other tools.

In an embodiment, color is used as an indicator on the image of the restoration 1501 or 1601 displayed on the monitor 406. For example, in an embodiment, if a contrasting color is displayed on any part of the restoration 1501 or 160 this indicates that this area is thinner than the manufacturer's recommended minimum thickness for the restoration and should be corrected. The Add, Smooth, or Free From tools can be used for this purpose.

In the embodiment described, the Free Form, Smooth, Add and Remove tools each act on a specific area of the restoration 1501 or 1601 indicated by a circle that is shown when clicking over the restoration 1501 or 1601. The size of this area of influence can be changed with an Edit Influence tool displayed by an icon on the monitor 406. When the user clicks on the icon and, with the cursor over the restoration 1501 or 1601, clicks the left mouse button and moves the mouse up or down, this will adjust the size of the Area of Influence.

Editing the Contacts

Figure 17A:
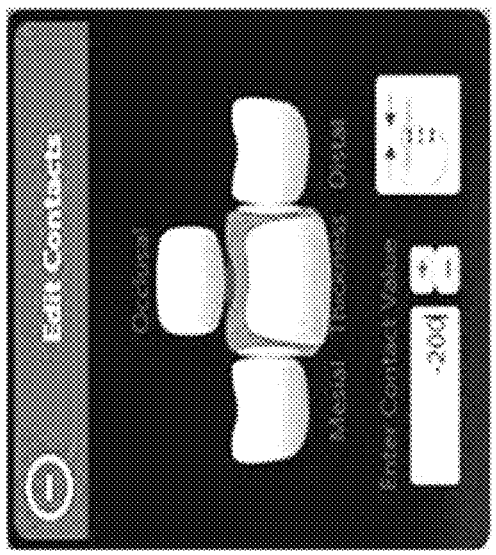
FIGS. 17A and 17B are examples of visual representations of an Edit Contacts feature provided with a dental restoration design program.
Figure 17B:

Turning next to FIGS. 17A-17B, the dental restoration design program includes an Edit Contacts feature 1701 to automatically adjust the occlusal, mesial and distal contacts. The program will initially propose predefined contact values which can be overridden if desired. To adjust the occlusion, the user enters the contact value desired and presses the Fix Contacts button. The contacts will be automatically adjusted to the assigned specification.

The Mesial and Distal contacts are adjusted in a similar way. The user toggles the mesial/distal contact indicators on by pressing the Mesial or Distal buttons in the Edit Contacts window 1701. The mesial and distal contacts can be adjusted together or separately. The user enters the desired Contact Value and presses the Fix Contacts button.

In an embodiment, the contact areas 1802 can be viewed by toggling off the visibility of the preparation jaw, thereby isolating the view of the restoration 1801, as shown in FIG. 18.

In a further embodiment, a process is provided where predefined contact values or ranges for tooth positioning are established and a prompt, such as "pass"/"fail", may be displayed on a user output device to indicate whether the contact values of the design proposal are calculated to be within the predefined range. If a calculated contact value is determined to be outside of the predefined contact value range, a prompt, such as "tight" or "open", may be automatically displayed instead of displaying the actual numerical value, to indicate whether the proposed restoration contact value is below or above the predefined contact value. In a further embodiment, an automated procedure is provided for evaluating the contact values of a proposed design proposal, calculating if the proposed design proposal is within a predefined contact value range, and automatically adjusting the placement of a library tooth to adjust the design proposal to achieve contact values that are within a predefined range.

Placing the Milling Sprue

With reference to FIG. 19, once the user is satisfied with the designed restoration 1901, the finished restoration 1901 is displayed in order to place the milling sprue 1902. On a crown restoration, the milling sprue 1902 will automatically be placed on the lingual surface at the height-of-contour of the restoration 1901. This is shown in FIG. 19. This is typically a preferred location for the milling process. However, the user is free to move the sprue 1902 to another desired location as needed. In an embodiment, the restoration design program includes limitation that protect the margin and will not allow the user to place the sprue 1902 too close to the margin.

Sending the Manufacturing Files to the Fabrication Center

Upon completion of the dental restoration design, instructions for manufacturing a dental restoration may be created from the design and transmitted to a fabrication machine. For example, in one embodiment, once the user is satisfied with the location of the sprue 1902, the user can instruct the dental restoration program to begin creating the manufacturing files 408 to provide instructions for the mill or other fabrication mechanism. These instructions are then used as an input to a restoration fabrication device or method.

Figure 20:
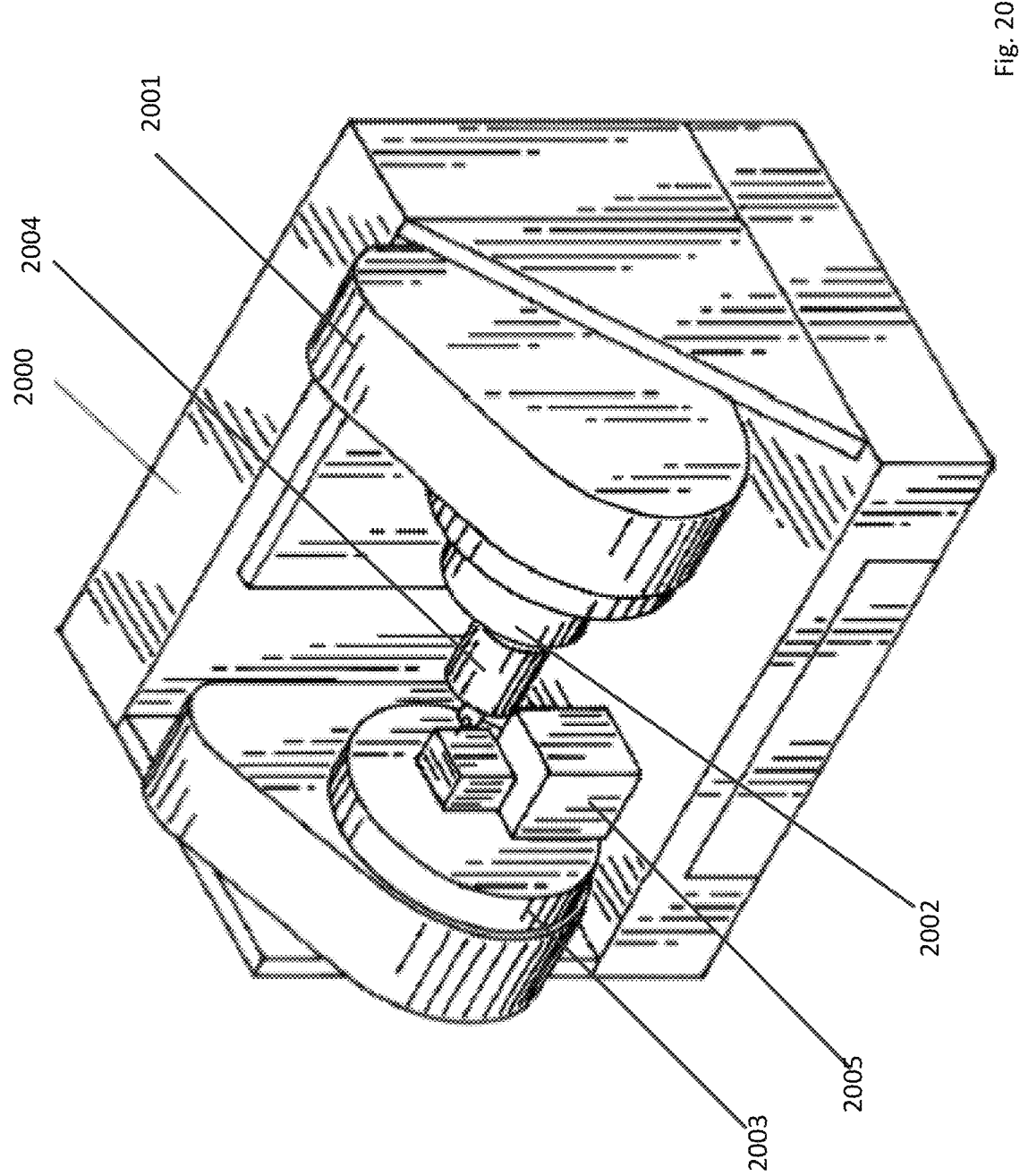
FIG. 20 is a perspective view of a restoration manufacturing mill suitable for fabricating a dental restoration.

For example, as shown in FIG. 20, a mill 2000 is adapted to fabricate dental appliances based on intermediate and final data set information received from the dental restoration design system 400. A simple rigid box structure supports a motion control mechanism which consists of a statically mounted linear Z axis 2001 mounted directly to the structure, a dynamically mounted rotary B axis 2002 that is carried by the linear stage and an opposing statically mounted A axis rotary 2003 that is offset with respect to the center of the B rotary axis. A spindle 2004 is also carried on the dynamically mounted rotary axis. The spindle 2004 can be translated axially with respect to the spindle rotation by the movement of the linear Z axis 2001. The statically mounted A axis rotary 2003 carries another rotary axis termed an "indexer" 2005. The indexer 2005 supports the material to be machined. The indexer 2005 allows access to the work piece from multiple angles and it may be electrically or pneumatically driven, open or closed loop and used for non-simultaneous positioning or full simultaneous motion with the other axes. It may also support a piezo electric actuator or other means ultrasonically exciting the work piece. A suitable chair-side milling machine is disclosed in co-pending U.S. patent application Ser. No. 13/495,620 filed on Jun. 13, 2012, which is hereby incorporated by reference in its entirety. The details of the milling machine and its use are described therein, and will not be reproduced here.

In some embodiments, the mill 2000 may be a chairside mill and readily accessible to the dentist or other user. In other embodiments using a distributed environment, the mill 2000 or other fabrication machine may be located at a remote location and receive data set information from the design system 400 over a network or other communication mechanism. The dentist or manufacturer selects the appropriate millable component and places it into the milling machine 2000. (See FIG. 20). After such installation, the milling machine follows the transferred manufacturing instructions to mill the component into a finished restoration needing only separation of the mandrel and polishing or brazing.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD ROM, hard disk, or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner. In some embodiments, the system is implemented in a "non-transitory" computer-readable storage medium, by which is meant any or all computer-readable media, with the sole exception being a transitory, propagating signal.

The foregoing systems and methods have been described in terms of particular embodiments. Other embodiments are within the scope of the following claims. For example, the tooth models may be posted on a hypertext transfer protocol (http) web site for limited access by the corresponding patients and treating clinicians. As an additional example, practice of the described processes may be distributed across devices such as a scanning device (intraoral or otherwise) and/or a computer and/or a fabrication facility and/or a dental laboratory and/or a server in a number of ways, or all of the functionality may be integrated into a dedicated, standalone device. All such permutations and combinations are intended to fall within the scope of the present disclosure.

In some embodiments, automatic computer-implemented processes are provided whereby discrete modules or steps of the processes described herein are performed on servers that are remote or unknown to a user, and which may perform processes or design steps with minimal input or knowledge on the part of a user. For example, in one embodiment of a cloud computing environment, processes described herein may be performed as a service rather than a product operated by the user, and software and information may be provided over a network. In one embodiment, a patient record comprising the scanned model of a patient's dentition stored on a local computer, for example, in a dental laboratory or a dentist's office, may be transmitted or received via a network interface by a remote server and processed in a cloud computing environment. In a cloud computing environment computation, software storage, data access and record storage services may reside on a remote server, and processes may occur with minimal input on the part of a user. In one embodiment, data files for library arch form, library teeth, and library teeth cusps, may be stored at a location remote from a user.

In one embodiment, a computer-implemented method is provided that comprises obtaining a patient's scanned model from a first computer through a user interface; performing at least one method step in a cloud computing environment selected from lining a margin of a preparation tooth, identifying cusps of a scanned model, and fitting buccal and lingual arcs to the cusps of the scanned model; and in a cloud-computing environment performing at least one method step selected from calculating a scaling factor and scaling the library arch form to approximately correspond with the patient's dentition, and registering buccal and lingual arcs of the scanned model and library arch form; and proposing a restoration design. In another embodiment, information generated from cloud computing processes, such as a design proposal, may be transmitted to a user via a network interface, or transmitted to a manufacturing device such as a mill, for making the physical dental restoration to be placed in a patient's mouth.

In a further embodiment, a computer-implemented method is provided for designing a dental restoration comprising, obtaining a virtual three dimensional representation of a patient's dentition comprising a preparation tooth through a user interface; and forming a virtual dental restoration for the preparation tooth, wherein the steps of forming a restoration comprises lining a margin of the preparation tooth, identifying cusps on the three dimensional representation of a patient's dentition, fitting buccal and lingual arcs to the cusps of the patient's dentition, scaling a pair of buccal and lingual arcs of a library arch form to correspond arcs of the patient's dentition, registering virtual three dimensional representation of the patient's dentition and the and library arch form, and proposing a restoration design, wherein at least one of the process steps of forming a virtual dental restoration is performed in a cloud computing environment.

Further, while the foregoing systems and methods have been shown and described with reference to one or more embodiments thereof, those skilled in the art will understand that the above and other changes in form and detail, as well as order of process steps, may be made without departing from the spirit and scope of the following claims. Further, elements such as processes, modules, programs, rules, steps, and the like may be implemented as discrete components or in combination with other components, and therefore fall within the scope and spirit of the principles of the present disclosure.

What is claimed is:

1. A computer-implemented method of providing a dental restoration for a patient, wherein the method comprises,
   executing a plurality of instructions on a computing system to perform the steps of:
   providing a virtual three dimensional representation of at least a portion of the patient's dentition that includes at least one preparation tooth and at least one neighboring tooth of the patient, the at least one preparation tooth comprising a first preparation tooth and the at least one neighboring tooth of the patient comprising a first neighboring tooth closer in distance to the first preparation tooth than a second neighboring tooth,
   wherein the first preparation tooth comprises a tooth that has been modified to accommodate a dental restoration;
   identifying a preparation margin of the first preparation tooth on the virtual three dimensional representation;
   designing a restoration design for the first preparation tooth comprising the steps of
      providing a library arch form of a virtual tooth library that comprises a first library tooth representing the first preparation tooth, a second library tooth representing the first neighboring tooth, and a third library tooth representing the second neighboring tooth,
      placing the library arch form in an initial alignment with the at least one preparation tooth and the at least one neighboring tooth of the virtual three dimensional representation of the patient's dentition,
         wherein the library arch form comprises a curvature corresponding to an anatomical curvature of teeth within a mouth;
      aligning one or more of the library teeth representing the at least one neighboring tooth with a corresponding neighboring tooth of the virtual three dimensional representation of the patient, and
      interpolating a position, an orientation, and a scale for the first library tooth based on the second library tooth and the third library tooth, with greater weight to the second library tooth; and
   proposing an initial restoration design for the first preparation tooth based upon a tooth design of the first library tooth obtained from the virtual tooth library.

2. The computer-implemented method according to claim 1, wherein the method further comprises:
   modifying the initial restoration design to obtain a final restoration design.

3. The computer-implemented method according to claim 2, wherein the method further comprises:
   using the final restoration design to manufacture a final restoration.

4. The computer-implemented method according to claim 1, wherein the method further comprises:
   fitting the library arch form to the virtual three dimensional representation.

5. The computer-implemented method according to claim 4, wherein fitting the library arch form to the virtual three dimensional representation includes one or more of shifting the library arch form mesially, uniformly scaling the library arch form, shifting the library arch form buccally, or rotating the library arch form around an occlusal axis.

6. The computer-implemented method according to claim 1, wherein aligning the positions of one or more individual teeth included in the library arch form includes one or more of shifting the one or more individual teeth buccally, shifting the one or more individual teeth occlusally, shifting the one or more individual teeth mesially-distally, changing the tip angle of the one or more individual teeth, changing the rotation angle of the one or more individual teeth, or scaling the one or more individual teeth.

7. A non-transitory computer readable medium storing a program causing a computer to execute a dental restoration design process, the dental restoration design process comprising,
   executing a plurality of instructions on a computing system to perform the steps of:
   providing a virtual three dimensional representation of at least a portion of a patient's dentition that includes at least one preparation tooth and at least one neighboring tooth of the patient, the at least one preparation tooth comprising a first preparation tooth and the at least one neighboring tooth of the patient comprising a first neighboring tooth closer in distance to the first preparation tooth than a second neighboring tooth,
   wherein the first preparation tooth comprises a tooth of the patient that has been modified to accommodate a dental restoration;
   identifying a preparation margin of the at least one preparation tooth of the patient on the virtual three dimensional representation;
   placing a library arch form of a virtual tooth library that comprises a first library tooth representing the first preparation tooth, a second library tooth representing the first neighboring tooth, and a third library tooth representing the second neighboring tooth, in an initial alignment with the at least one preparation tooth and the at least one neighboring tooth of the virtual three dimensional representation of the patient,
      wherein the library arch form comprises a curvature corresponding to an anatomical curvature of teeth within a mouth;
   aligning one or more of the library teeth representing the at least one neighboring tooth with a position of a the corresponding neighboring tooth of the virtual three dimensional representation of the patient;
   interpolating a position, orientation, and scale of the first library tooth based on the second library tooth and the third library tooth, with greater weight to the second library tooth; and
   proposing an initial restoration design for the first preparation tooth based upon a tooth design of the first library tooth obtained from the virtual tooth library.

8. The computer-implemented method according to claim 7, wherein the method further comprises:
   modifying the initial restoration design to obtain a final restoration design.

9. The computer-implemented method according to claim 8, wherein the method further comprises:
   using the final restoration design to manufacture a final restoration.

10. The computer-implemented method according to claim 7, wherein the method further comprises:
fitting the library arch form to the virtual three dimensional representation.

11. The computer-implemented method according to claim 10, wherein fitting the library arch form to the virtual three dimensional representation includes one or more of shifting the library arch form mesially, uniformly scaling the library arch form, shifting the library arch form buccally, or rotating the library arch form around an occlusal axis.

12. The computer-implemented method according to claim 10 wherein aligning the positions of one or more individual teeth included in the library arch form includes one or more of shifting the one or more individual teeth buccally, shifting the one or more individual teeth occlusally, shifting the one or more individual teeth mesially-distally, changing the tip angle of the one or more individual teeth, changing the rotation angle of the one or more individual teeth, or scaling the one or more individual teeth.

* * * * *